US011645205B2

(12) United States Patent
Wills

(10) Patent No.: US 11,645,205 B2
(45) Date of Patent: May 9, 2023

(54) METHOD, APPARATUS AND COMPUTER PROGRAM PRODUCT FOR IMPLEMENTING FILTER CACHE IN A GROUP-BASED COMMUNICATION PLATFORM

(71) Applicant: Slack Technologies, LLC, San Francisco, CA (US)

(72) Inventor: Joshua Wills, San Francisco, CA (US)

(73) Assignee: Slack Technologies, LLC, San Francisco, CA (US)

( * ) Notice: Subject to any disclaimer, the term of this patent is extended or adjusted under 35 U.S.C. 154(b) by 0 days.

(21) Appl. No.: 17/752,496

(22) Filed: May 24, 2022

(65) Prior Publication Data
US 2022/0283944 A1    Sep. 8, 2022

Related U.S. Application Data

(63) Continuation of application No. 16/939,611, filed on Jul. 27, 2020, now Pat. No. 11,360,896, which is a (Continued)

(51) Int. Cl.
*G06F 16/00* (2019.01)
*G06F 12/0815* (2016.01)
(Continued)

(52) U.S. Cl.
CPC ...... *G06F 12/0815* (2013.01); *G06F 16/2228* (2019.01); *G06F 16/2365* (2019.01);
(Continued)

(58) Field of Classification Search
CPC ............. G06F 12/0815; G06F 16/2228; G06F 16/2365; G06F 16/93; G06F 2212/1016;
(Continued)

(56) References Cited

U.S. PATENT DOCUMENTS

| 6,065,058 A | * | 5/2000 | Hailpern | ............. H04L 63/0209 |
| | | | | 709/204 |
| 9,609,043 B2 | * | 3/2017 | Homsany | ................ G06F 21/10 |

(Continued)

OTHER PUBLICATIONS

"Die, Email, Die! A Flickr Cofounder Aims to Cut Us all Some Slack", Readwriteweb, LexisNexis, https://advance.lexis.com/api/permalink/33dd79e2-90f5-409d-ae27-5a2c7e86bf31/?context=1000516>. (dated Aug. 14, 2013, 4:15 PM) 2 pages.
(Continued)

*Primary Examiner* — Jared M Bibbee
(74) *Attorney, Agent, or Firm* — Erise IP, P.A.

(57) ABSTRACT

Method, apparatus and computer program product for generating filter cache are described herein. For example, the apparatus includes at least one processor and at least one non-transitory memory including program code. The at least one non-transitory memory and the program code are configured to, with the at least one processor, cause the apparatus to at least generate an index document array, generate a group identifier lookup array, generate a channel identifier lookup array, and generate a filter cache for the index document array based at least on the group identifier lookup array and the channel identifier lookup array.

20 Claims, 13 Drawing Sheets

Related U.S. Application Data continuation of application No. 16/049,175, filed on Jul. 30, 2018, now Pat. No. 10,795,816.

(51) Int. Cl.
  *G06F 16/93* (2019.01)
  *G06F 16/22* (2019.01)
  *G06F 16/23* (2019.01)
(52) U.S. Cl.
  CPC ...... *G06F 16/93* (2019.01); *G06F 2212/1016* (2013.01); *G06F 2212/608* (2013.01)
(58) Field of Classification Search
  CPC .... G06F 2212/608; G06F 16/41; G06F 16/00; G06Q 10/10
  See application file for complete search history.

(56) References Cited

U.S. PATENT DOCUMENTS

| | | | | |
|---|---|---|---|---|
| 10,019,360 | B2* | 7/2018 | Wang | G06F 12/084 |
| 10,691,757 | B1* | 6/2020 | Chen | G06F 21/604 |
| 10,943,023 | B2* | 3/2021 | Zhou | G06F 16/93 |
| 2009/0300289 | A1* | 12/2009 | Kurts | G06F 12/082 |
| | | | | 711/146 |
| 2017/0150326 | A1* | 5/2017 | Hampel | H04W 4/06 |
| 2018/0287982 | A1 | 10/2018 | Draeger et al. | |

OTHER PUBLICATIONS

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.
Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.
David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.
Jonathan Vanian, "Why these startups think chat apps are the next big thing in workplace collaboration", Gigaom, LexisNexis, https://advance.lexis.com/api/permalink/e83778c8-09c8-43aa-9ba0-88526283de69/?context=1000516, (dated Aug. 1, 2014, 5:45 PM) 4 pages.
Matsumoto, T. et al., "Chocoa Communicator—A New Communication System Based on Awareness and Text Communications-", Fujitsu Sci. Tech J., 36, 2, (Dec. 2000) 154-161.
Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", Pandodaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, is Valued at $1.1 Billion", The New York Times Blogs (Bits), LexisNexis, https://advance.lexis.com/api/permalink/3eb84b34-a8f9-4d7d-9573-89d9598a4963/?context=1000516>. (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield on How Slack Became A $2.8 Billion Unicorn", Forbes, [online][retrieved May 9, 2019], Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

\* cited by examiner

METHOD, APPARATUS AND COMPUTER PROGRAM PRODUCT FOR IMPLEMENTING FILTER CACHE IN A GROUP-BASED COMMUNICATION PLATFORM

RELATED APPLICATIONS

This patent application is a continuation application claiming priority benefit, with regard to all common subject matter, of U.S. patent application Ser. No. 16/939,611, filed Jul. 27, 2020, and entitled "METHOD, APPARATUS AND COMPUTER PROGRAM PRODUCT FOR IMPLEMENTING FILTER CACHE IN A GROUP-BASED COMMUNICATION PLATFORM" ("the '611 application"). The '611 application is a continuation application claiming priority benefit, with regard to all common subject matter, of U.S. patent application Ser. No. 16/049,175, filed Jul. 30, 2018, and entitled "METHOD, APPARATUS AND COMPUTER PROGRAM PRODUCT FOR IMPLEMENTING FILTER CACHE IN A GROUP-BASED COMMUNICATION PLATFORM," now U.S. Pat. No. 10,795,816, issued Oct. 6, 2020. The above-referenced application and patent are hereby incorporated by reference in their entirety into the present application.

BACKGROUND

Applicant has identified many deficiencies and problems associated with existing methods, apparatus, and systems related to searching electronic messages. Through applied effort, ingenuity, and innovation, many of these identified deficiencies and problems have been solved by developing solutions that are in accordance with embodiments of the present disclosure, many examples of which are described in detail herein.

BRIEF SUMMARY

In general, embodiments of the present invention provide methods, apparatus, systems, computing devices, and/or the like for generating a filter cache data structure and facilitating search in a group-based communication platform by utilizing the filter cache data structure.

In accordance with one aspect, an apparatus is provided. The apparatus comprises at least one processor and at least one non-transitory memory comprising program code. The at least one non-transitory memory and the program code are configured to, with the at least one processor, cause the apparatus to at least generate an index document array, wherein the index document array comprises a plurality of index documents, wherein each of the plurality of index documents is associated with a group identifier and a channel identifier; generate a group identifier lookup array comprising a plurality of group identifier nodes, wherein each group identifier node corresponds to an unique group identifier associated with the plurality of index documents; generate a channel identifier lookup array comprising a plurality of channel identifier nodes, wherein each channel identifier node corresponds to an unique channel identifier associated with the plurality of index documents; generate a filter cache for the index document array based at least on the group identifier lookup array and the channel identifier lookup array, wherein the filter cache comprises: a group identifier offset array comprising a plurality of group identifier pointers, wherein each group identifier pointer maps a group identifier node in the group identifier lookup array to a first corresponding channel identifier node in the channel identifier lookup array; and a channel identifier offset array comprising a plurality of channel identifier pointers, where each channel identifier pointer maps a channel identifier node in the channel identifier lookup array to a first corresponding index document in the index document array; and store the filter cache in the at least one non-transitory memory.

In accordance with another aspect, the filter cache further comprises the group identifier lookup array and the channel identifier lookup array.

In accordance with another aspect, generating the index document array further causes the apparatus to sort the plurality of index documents according to group identifiers associated with the plurality of index documents; and subsequent to sorting the plurality of index documents according to the group identifiers, sort two or more index documents having a same group identifier according to channel identifiers associated with the two or more index documents.

In accordance with another aspect, generating the group identifier lookup array further causes the apparatus to: generate a group identifier array comprising a plurality of group identifiers, wherein one index document in the index document array corresponds to one group identifier in the group identifier array; and identify one or more unique group identifiers by removing duplicate group identifiers from the group identifier array.

In accordance with another aspect, generating the channel identifier lookup array further causes the apparatus to: generate a channel identifier array comprising a plurality of channel identifiers, wherein one index document in the index document array corresponds to one channel identifier in the channel identifier array; and identify one or more unique channel identifiers by removing duplicate channel identifiers from the channel identifier array.

In accordance with another aspect, the at least one non-transitory memory and the program code are configured to, with the at least one processor, cause the apparatus to further receive a search query associated with the plurality of index documents, wherein the search query comprises a group identifier criterion; identify a first group identifier node in the group identifier lookup array based on the group identifier criterion; determine a first channel identifier node associated with the first group identifier node based on the group identifier offset array; identify a second group identifier node in the group identifier lookup array, wherein the second group identifier node is subsequent to the first group identifier node in the group identifier lookup array; and determine a second channel identifier node associated with the second group identifier node based on the group identifier offset array.

In accordance with another aspect, the search query further comprises a channel identifier criterion. The at least one non-transitory memory and the program code are configured to, with the at least one processor, cause the apparatus to further: determine one or more channel identifier nodes based on the first channel identifier node and the second channel identifier node in the channel identifier lookup array; and determine whether the channel identifier criterion is associated with the one or more channel identifier nodes.

In accordance with another aspect, a computer-implemented method is provided. The computer-implemented method comprises generating an index document array, wherein the index document array comprises a plurality of index documents, wherein each of the plurality of index documents is associated with a group identifier and a channel identifier; generating a group identifier lookup array comprising a plurality of group identifier nodes, wherein each group identifier node corresponds to a unique group identifier associated with the plurality of index documents; generating a channel identifier lookup array comprising a plurality of channel identifier nodes, wherein each channel identifier node corresponds to a unique channel identifier associated with the plurality of index documents; generating a filter cache for the index document array based at least on the group identifier lookup array and the channel identifier lookup array, wherein the filter cache comprises: a group identifier offset array comprising a plurality of group identifier pointers, wherein each group identifier pointer maps a group identifier node in the group identifier lookup array to a first corresponding channel identifier node in the channel identifier lookup array; and a channel identifier offset array comprising a plurality of channel identifier pointers, where each channel identifier pointer maps a channel identifier node in the channel identifier lookup array to a first corresponding index document in the index document array; and storing the filter cache in at least one non-transitory memory.

In accordance with another aspect, a computer program product is provided. The computer program product comprises at least one non-transitory computer-readable storage medium having computer-readable program code portions stored therein. The computer-readable program code portions comprises an executable portion configured to: generate an index document array, wherein the index document array comprises a plurality of index documents, wherein each of the plurality of index documents is associated with a group identifier and a channel identifier; generate a group identifier lookup array comprising a plurality of group identifier nodes, wherein each group identifier node corresponds to a unique group identifier associated with the plurality of index documents; generate a channel identifier lookup array comprising a plurality of channel identifier nodes, wherein each channel identifier node corresponds to a unique channel identifier associated with the plurality of index documents; generate a filter cache for the index document array based at least on the group identifier lookup array and the channel identifier lookup array, wherein the filter cache comprises: a group identifier offset array comprising a plurality of group identifier pointers, wherein each group identifier pointer maps a group identifier node in the group identifier lookup array to a first corresponding channel identifier node in the channel identifier lookup array; and a channel identifier offset array comprising a plurality of channel identifier pointers, where each channel identifier pointer maps a channel identifier node in the channel identifier lookup array to a first corresponding index document in the index document array; and store the filter cache in the at least one non-transitory memory.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention. It will be appreciated that the scope of the invention encompasses many potential embodiments in addition to those here summarized, some of which will be further described below.

BRIEF DESCRIPTION OF THE DRAWINGS

Figure 1:
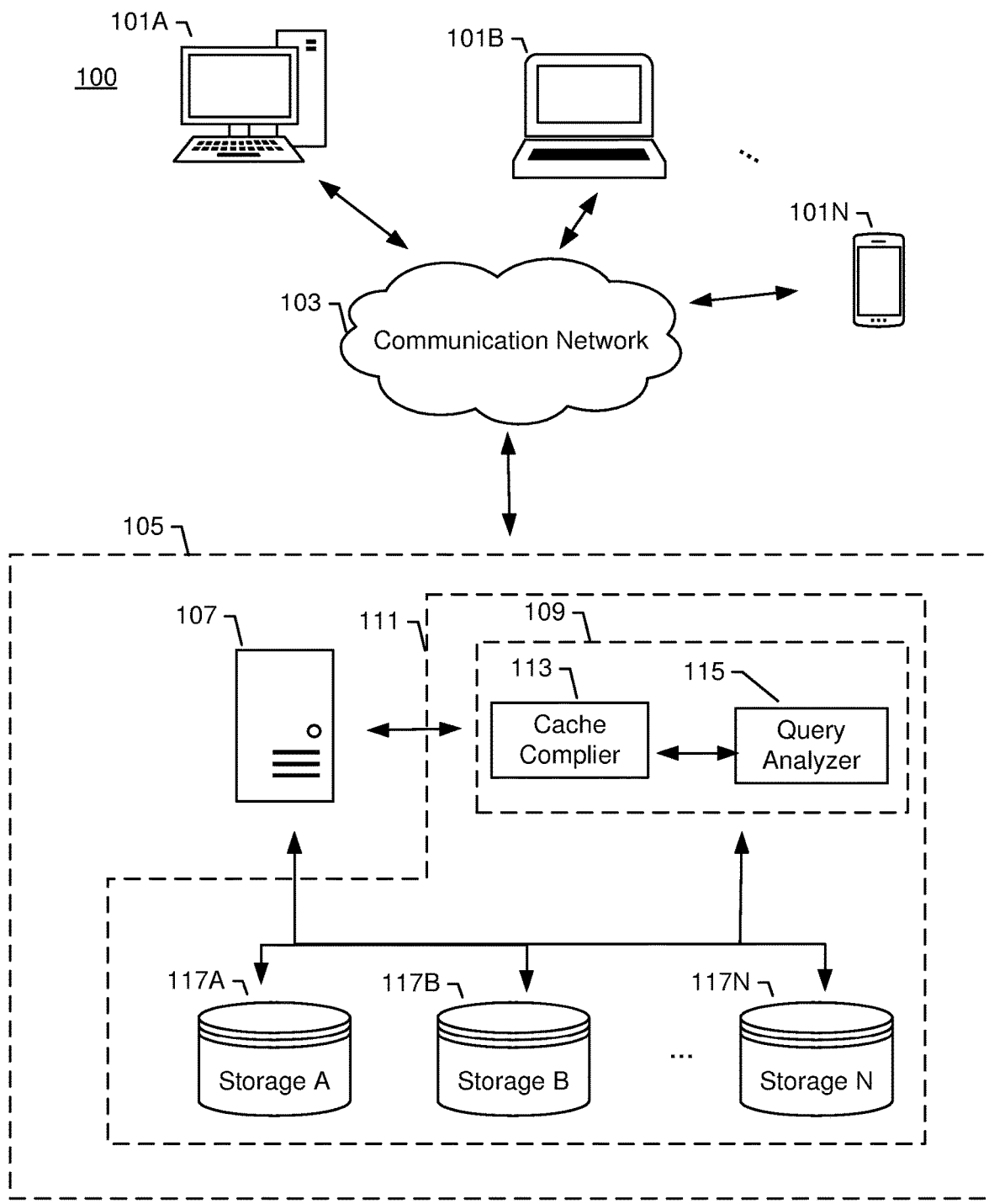
Figure 2:
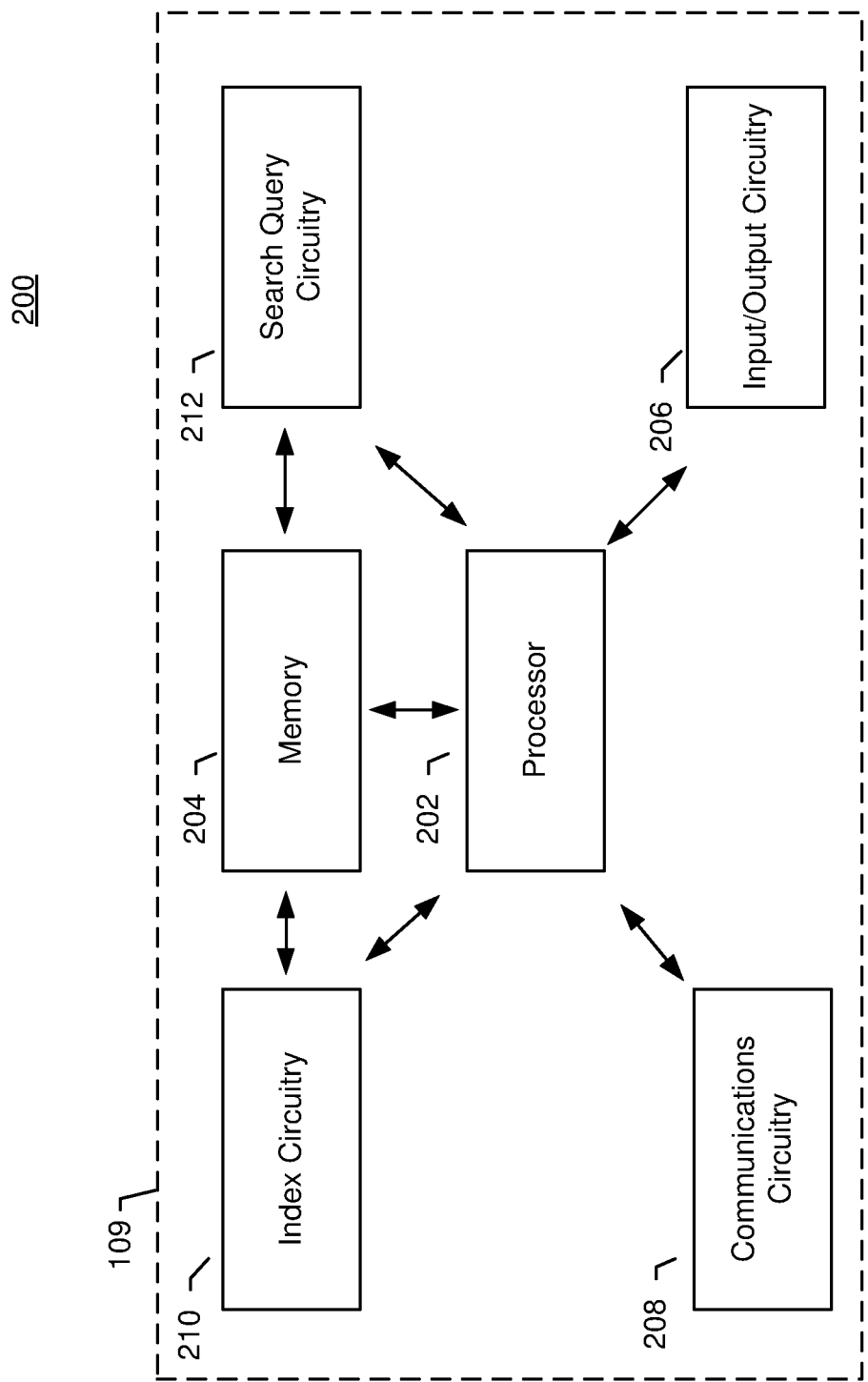
Figure 3:
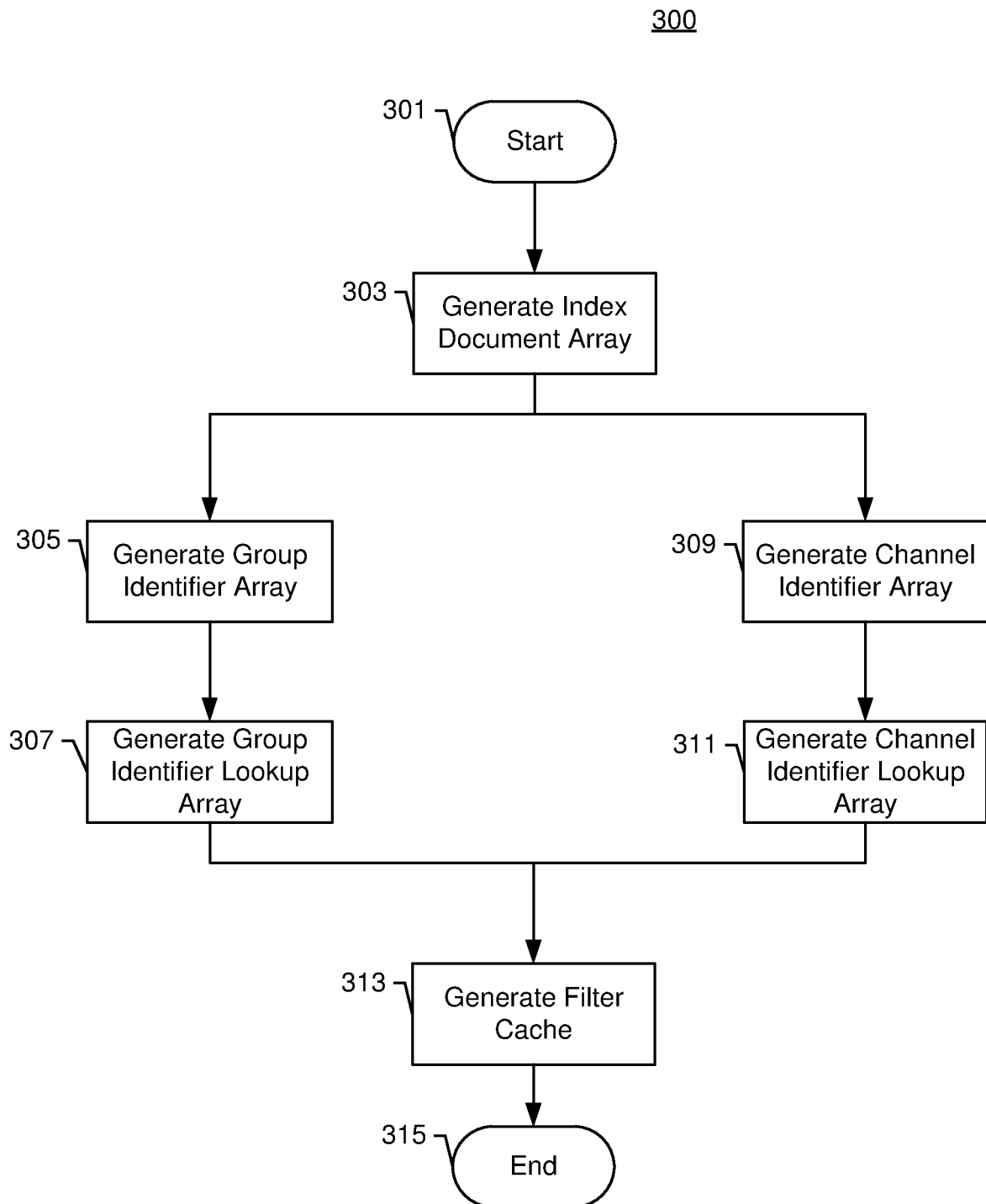
Figure 4:
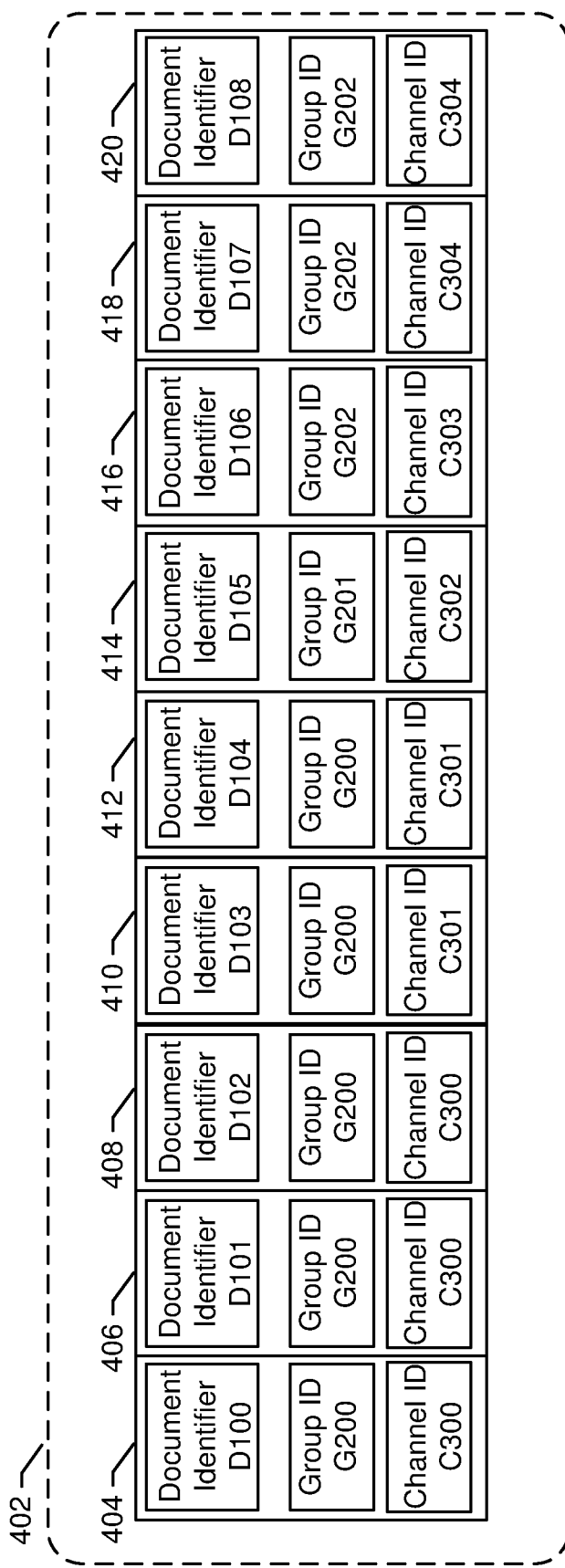
Figure 5:
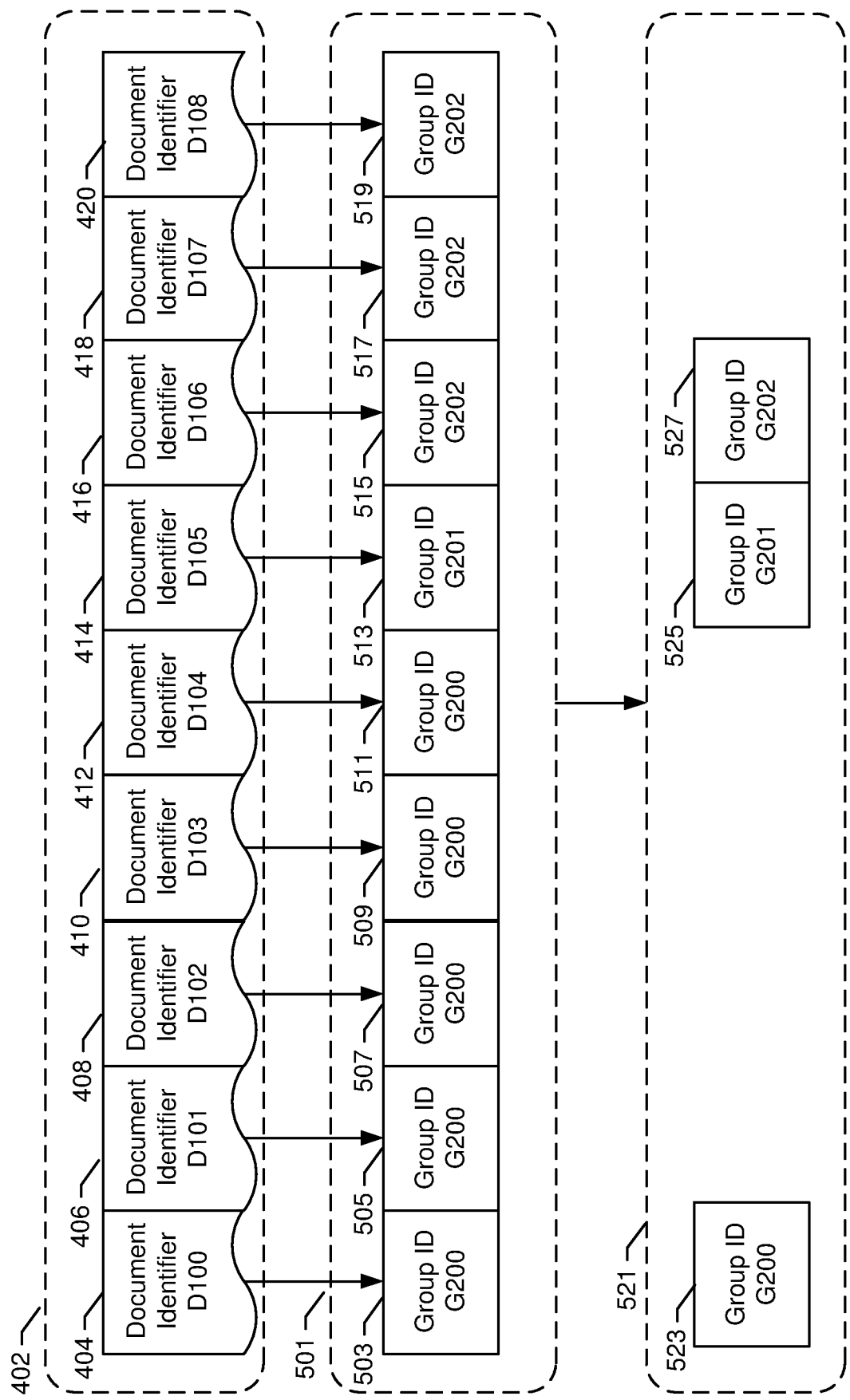
Figure 6:
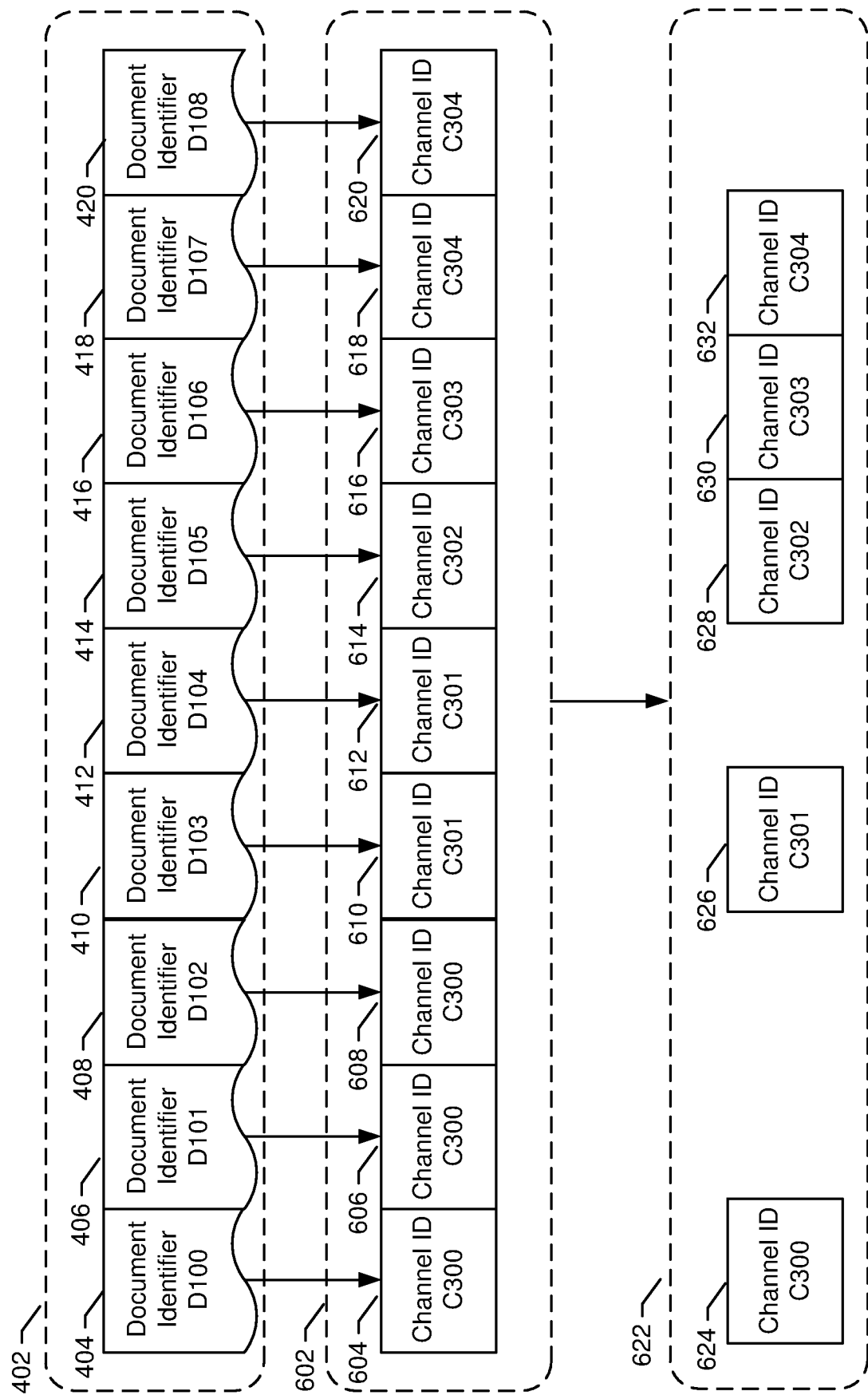
Figure 7:
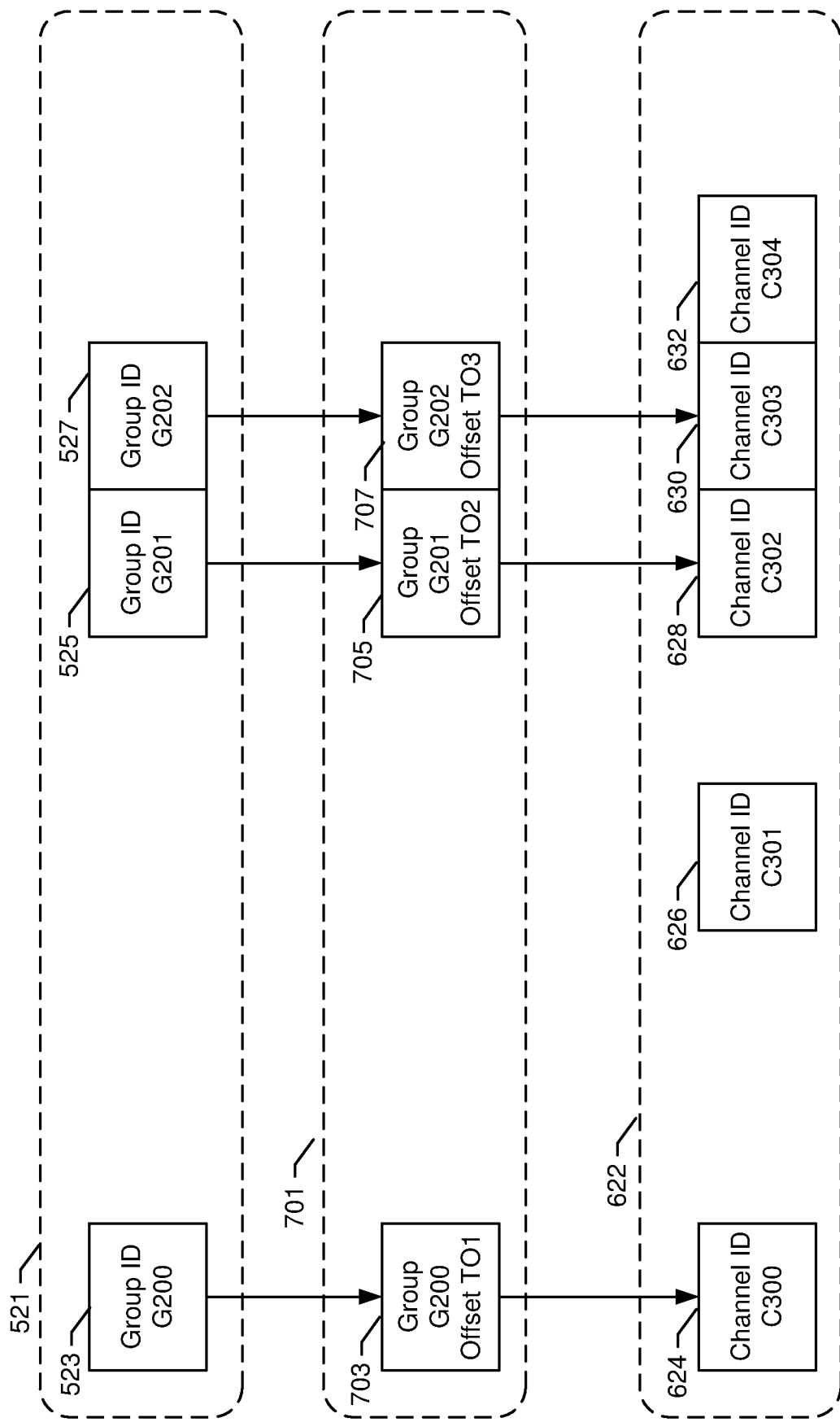
Figure 8:
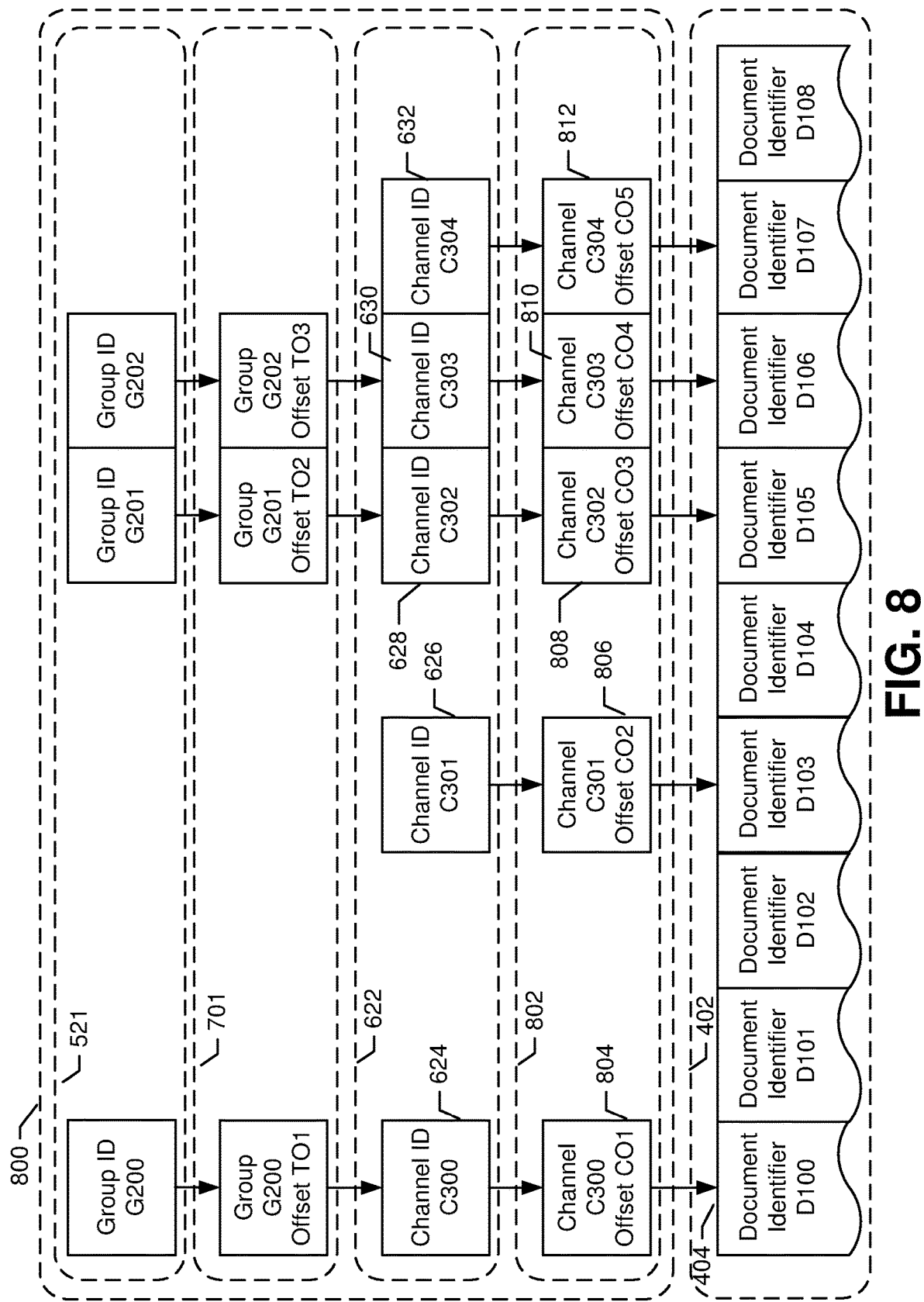
Figure 9A:
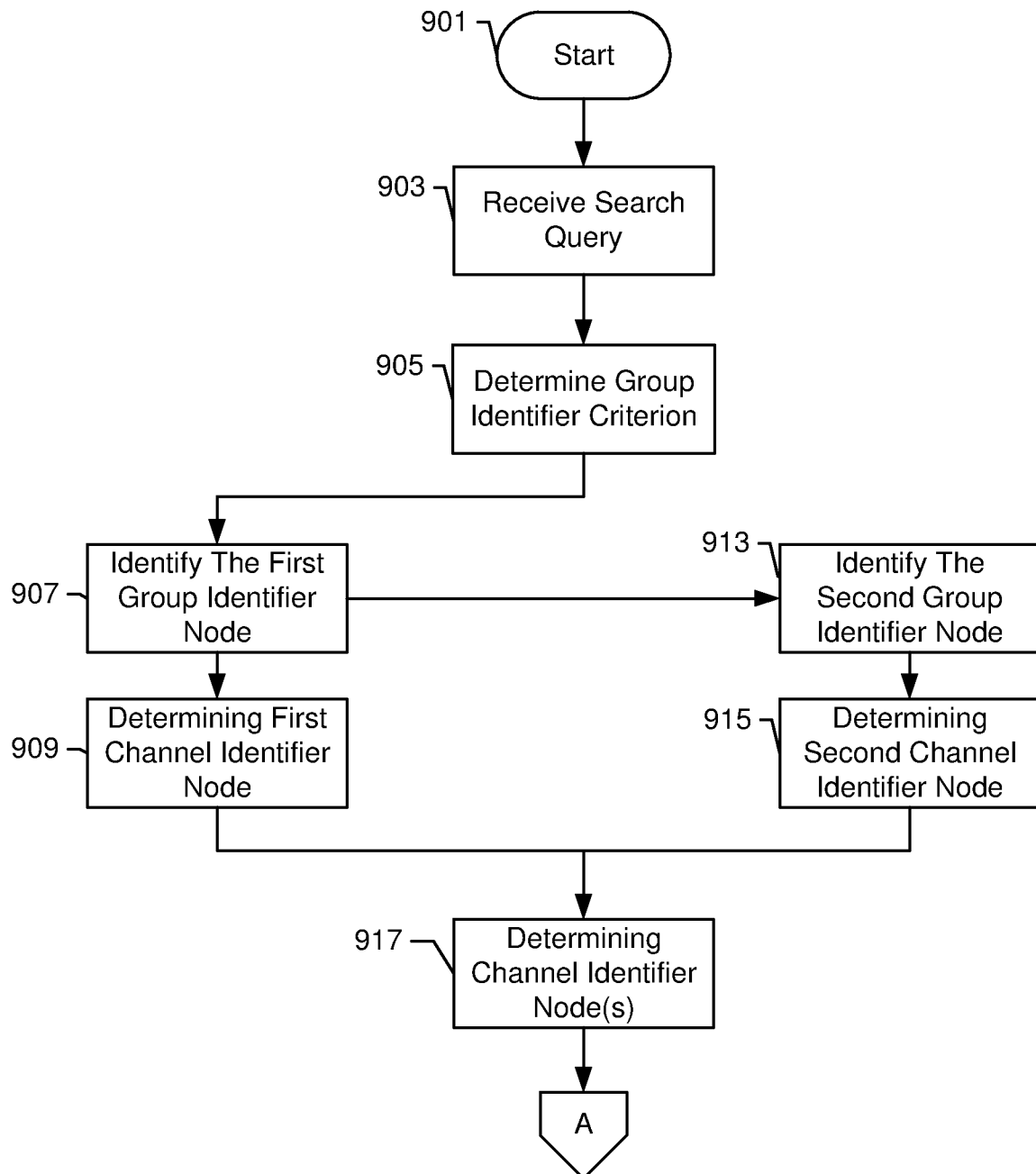
Figure 9B:
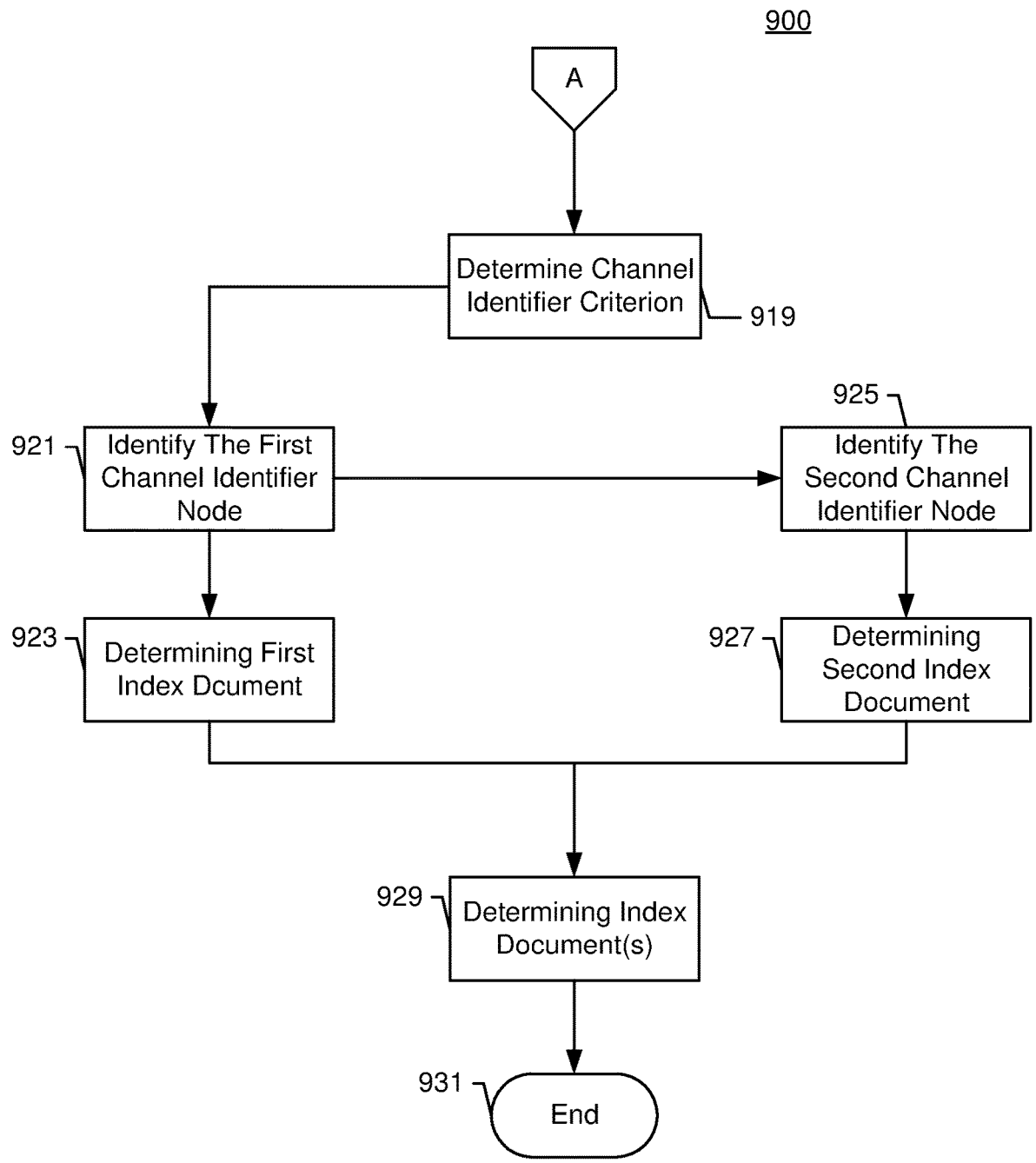
Figure 10:
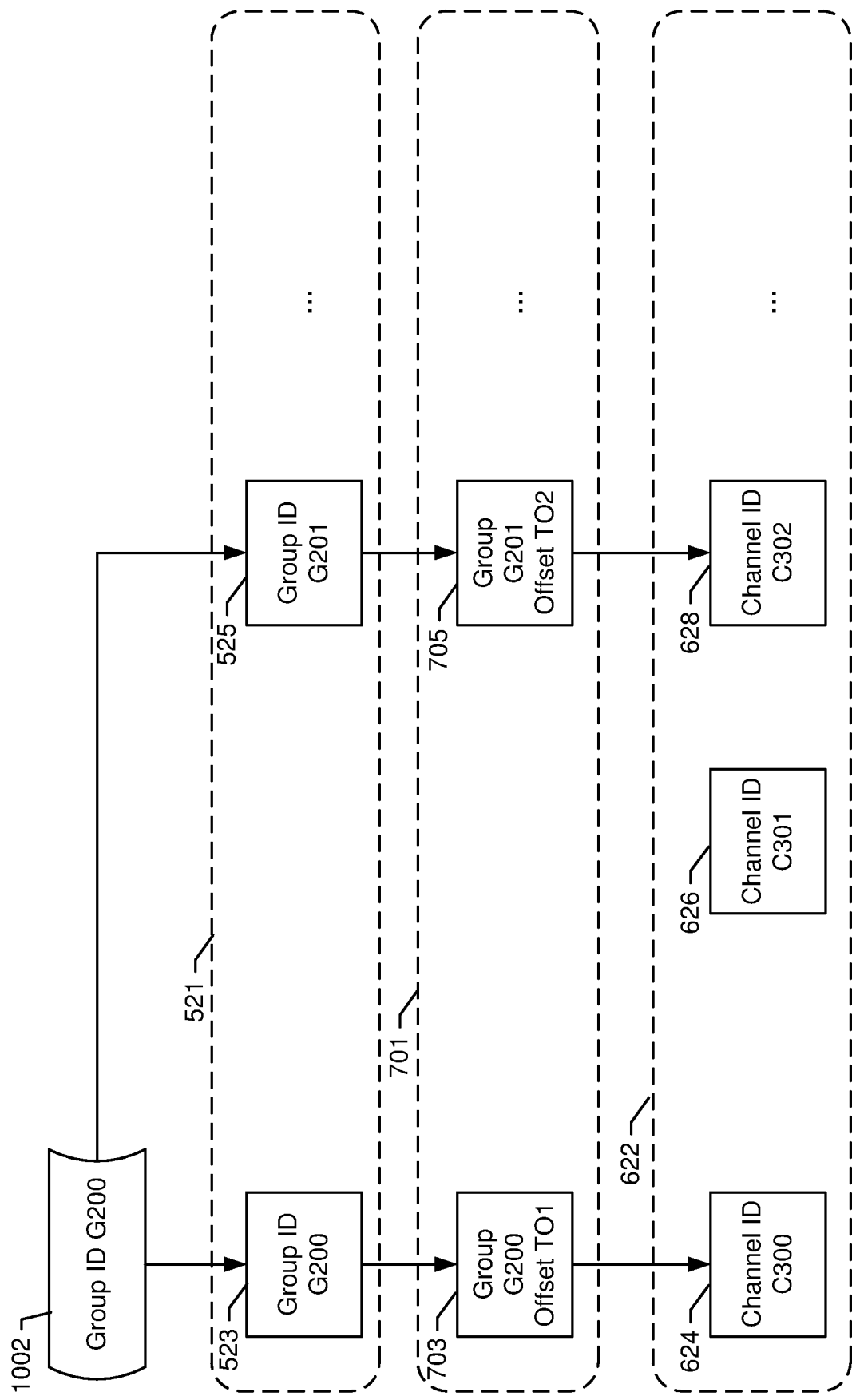
Figure 11:
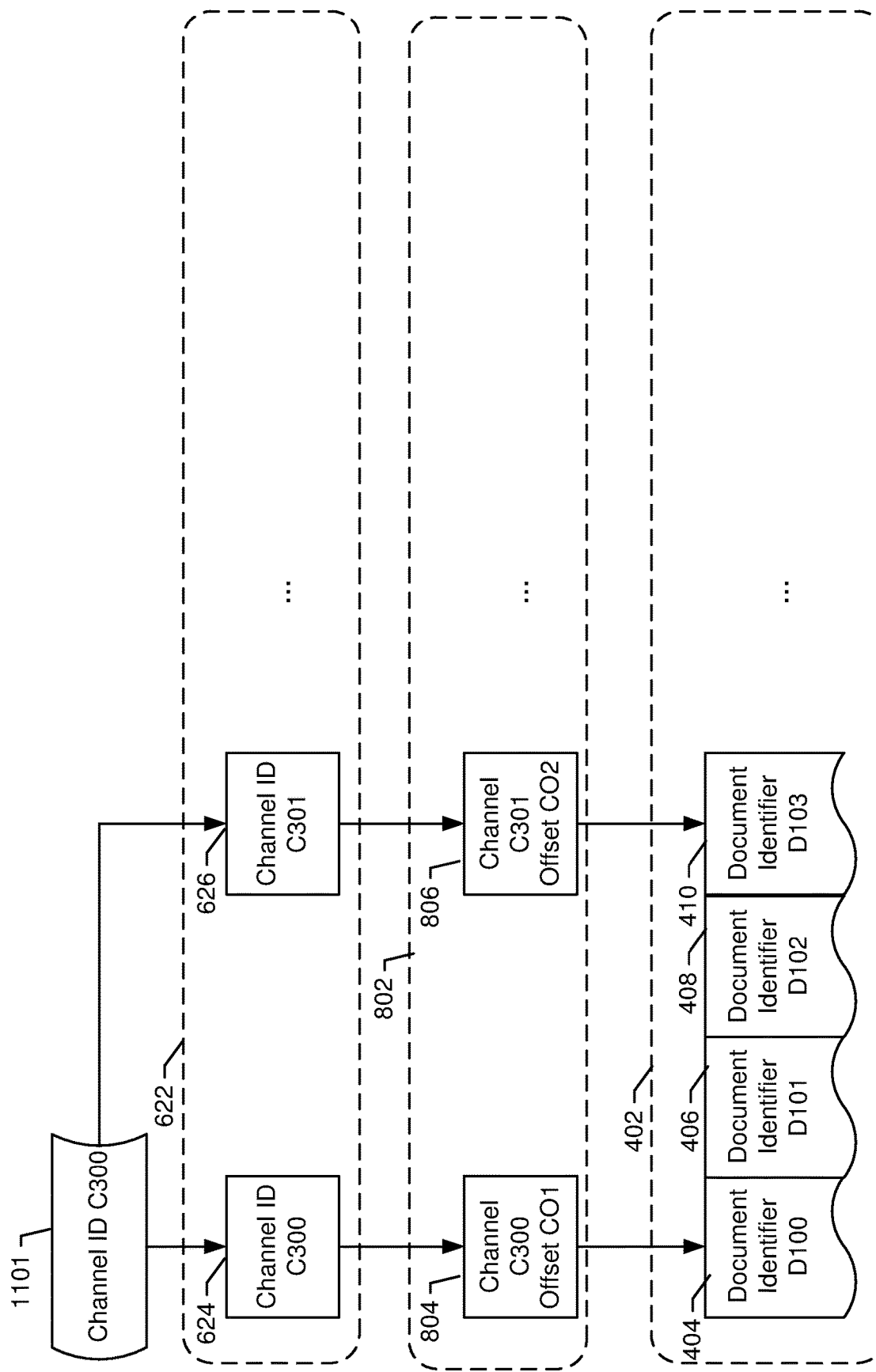
Figure 12:
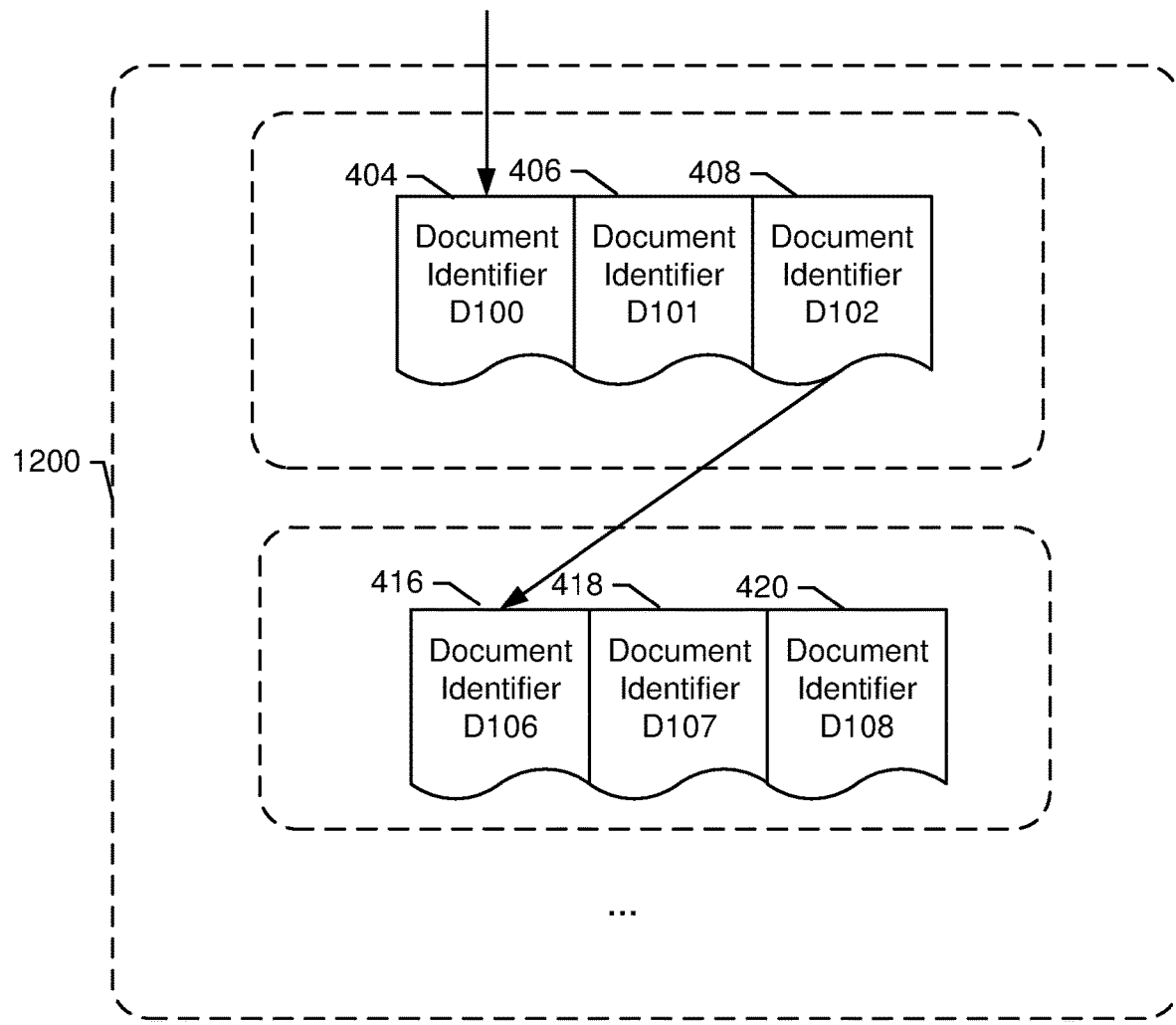

Having thus described some embodiments in general terms, references will now be made to the accompanying drawings, which are not necessarily drawn to scale, and wherein:

FIG. 1 is an example system architecture diagram illustrating a group-based communication platform in communication with client devices in accordance with some embodiments of the present invention;

FIG. 2 is an example system infrastructure diagram illustrating a server circuitry in accordance with some embodiments of the present invention;

FIG. 3 is an example flowchart illustrating generating filter cache in accordance with some embodiments of the present invention;

FIG. 4 is an example diagram illustrating an example index document array in accordance with some embodiments of the present invention;

FIG. 5 is an example data flow diagram illustrating generating an example group identifier array and an example group identifier lookup array in accordance with some embodiments of the present invention;

FIG. 6 is an example data flow diagram illustrating generating an example channel identifier array and an example channel identifier lookup array in accordance with some embodiments of the present invention;

FIG. 7 is an example data flow diagram illustrating generating an example group identifier offset array in accordance with some embodiments of the present invention;

FIG. 8 is an example data flow diagram illustrating generating an example channel identifier offset array in accordance with some embodiments of the present invention;

FIGS. 9A-9B are example flowcharts illustrating applying filter query using filter cache in response to search queries in accordance with some embodiments of the present invention; and FIGS. 10-12 are example data flow diagrams in accordance with some embodiments of the present invention.

DETAILED DESCRIPTION OF VARIOUS EMBODIMENTS

Various embodiments of the present invention are described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

Overview

Various embodiments of the present invention relate generally to indexing and searching in network systems. More specifically, various embodiments of the present invention are related to a group-based communication platform that provides fast, reliable data retrieval in response to a search query. The present invention provides technical improvements in data management (such as index compiling and storage).

As one of the most critical factors in system and network performance, latency indicates a user perceived delay between a user search request and any system/network response. In a messaging platform, users may submit search queries to request retrieval of certain data (for example, messages). Many users may expect a sub-second response time upon submission of a search query. High response latency (for example, 5 seconds) may distract users and cause them to incorrectly conclude that there is no data matching their search parameters. In other words, high response latency in handling search queries may provide a distorted perception regarding data stored in the messaging platform and may compromise system performance.

Technical challenges exist in reducing search latency. The size of data in a large-scale messaging platform may grow exponentially over time. For example, many organizations may need to keep historic message data for many years due to document retention policies, which creates a "data explosion" problem. Some messaging platforms use various remote storage system(s) to store data. However, when these messaging platforms receive a large volume of search queries, they must quickly access remote storage system(s) and analyze the large amounts of data stored in such remote storage system(s). Frequent data movement between messaging platforms and remote storage system(s) also creates a bottleneck in handling search queries, which can cause latency in returning search results to users.

In addition, different data in the same messaging platform may have different user access privileges. For example, a direct message between two users should only be retrievable for search indexing by the two users involved in the direct message (i.e., the sender and the recipient). In contrast, a group message in a shared group should be retrievable for search indexing by every user in that shared group, even if the group message is directed to only one user in the shared group. For example, if a user A sends a message to user B in a shared group, users other than A and B in the shared group should be able to retrieve that message. In other words, different users in the messaging platform have different, unique "views" of the messaging platform, and should only be able to retrieve data that he has the access privilege.

Some messaging platforms ignore the differences in access privileges among users, and permit all users to retrieve all data. This approach creates an unwanted "back door" in the messaging platform, and inadvertently overwrites the imposed access privileges. Some messaging platforms may only allow a user to retrieve data where he is the sender or the recipient. However, this approach prevents the user from retrieving certain data that he has access privilege to, and thus creates incomplete search results.

In contrast, systems structured in accordance with various embodiments of the invention provide specific, technical solutions to technical problems faced by messaging platforms. For example, various embodiments of the invention implement filter query operations based on filter cache. The filter query and the filter cache accommodate for different user access privileges, and provide quick reference to data stored in large blocks of an in-memory structure according to user access privileges. As a result, various embodiments of the present invention reduce latency in handling search queries, details of which are described hereinafter.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

The term "user" should be understood to refer to an individual, group of individuals, business, organization, and the like. The users referred to herein may access a group-based communication platform using client devices (as defined herein).

The term "user identifier" refers to an identifier that uniquely identifies information stored in a group-based communication platform that is related to a user. Information related to a user may be stored in a "user profile," "user account," or "user account details," which may include one or more group-based communication channel identifiers associated with group-based communication channels that the user has been granted access privileges to, one or more group identifiers for groups that the user has been granted access privileges to, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "group-based communication platform" refers to a system or virtual environment that has security sufficient such that it is accessible only to a defined group of users, thus enabling the defined group of users to communicate with each other through the system or virtual environment. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups. The group-based communication platform may take the form of one or more central servers disposed in communication with one or more additional servers running software applications, and having access to one or more databases storing digital content items, application-related data, and/or the like.

The term "group-based communication channel" refers to a virtual communication environment or feed that is configured to display messaging communications posted by channel members (e.g., validated users accessing the environment using client devices) that are viewable only to the members of the group. The format of the group-based communication channel may appear differently to different members of the group-based communication channel. However, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The terms "group identifier" or "team identifier" refer to one or more items of data by which a group-based communication platform may use to identify a group within the group-based communication system. For example, a group identifier may comprise ASCII text, a memory address, and the like.

The terms "channel identifier" or "group-based communication channel identifier" refer to one or more items of data by which the group-based communication platform may use to identify a group-based communication channel. For example, a channel identifier may comprise ASCII text, a memory address, and the like.

The term "index document" refers to a data structure that includes a set of fields, and each field has a name and a value. Index documents are the units of indexing and search, and each index document can be uniquely identified by an "index document identifier" field of the index document. In various embodiments of the present invention, an index document may correspond to an electronic message in a group-based communication platform. The terms "electronic message," "messaging communication," and "message" refer to electronically generated digital content object provided by a user using a client device and that is configured for display within a group-based communication channel. Further, electronic message may include text, image, video, audio or combination thereof provided by a user (using a client device). For instance, the user may provide an electronic message that includes text as well as an image and a video within the electronic message as message contents. In such a case, the text, image, and video would comprise the electronic message (or digital content object).

Index documents may be organized into an "index document array." The term "array" refers to a data structure including a collection of elements, and each element can be identified. The elements in an array are sorted according to an ordered sequence. For example, the index document array comprises a plurality of index documents, and each index document can be identified based on the value in the index document identifier field. In various embodiments of the present invention, the index documents in the index document array may be arranged and sorted based on the values in the group identifier field and the channel identifier field, details of which are described hereinafter.

As described in detail hereinafter, various embodiments of the present invention may generate a "group identifier array" based on an index document array. Each element in the group identifier array corresponds to a group identifier associated with an index document in the index document array. For example, if an index document array has five index documents with document identifiers ranging from D1 to D5:

{D1; D2; D3; D4; D5} where the first three index documents (D1-D3) are associated with a group identifier G1, and the last two index documents (D4-D5) are associated with a group identifier G2, then various embodiments of the present invention may generate a group identifier array as follows:

{G1; G1; G1; G2; G2}

Various embodiments of the present invention may also generate a "group identifier lookup array." Each element in the group identifier lookup array (i.e. a group identifier node) corresponds to a unique group identifier in a group identifier array. Continuing from the example above, various embodiments of the present invention may generate a group identifier lookup array for the index document array D1-D5 as follows:

{G1; . . . ; G2;}

As described in detail hereinafter, various embodiments of the present invention may generate a "channel identifier array" based on an index document array. Each element in the channel identifier array corresponds to a channel identifier associated with an index document in the index document array. For example, if an index document array has five index documents with document identifiers ranging from D1 to D5:

{D1; D2; D3; D4; D5} where the first two index documents are associated with a channel identifier C1, and the last three index documents are associated with a channel identifier C2, then various embodiments of the present invention may generate a group identifier array as follows:

{C1; C1; C2; C2; C2}

Various embodiments of the present invention may also generate a "channel identifier lookup array." Each element in the channel identifier lookup array (i.e. a channel identifier node) corresponds to a unique channel identifier in the channel identifier array. Continuing from the example above, various embodiments of the present invention may generate a channel identifier lookup array as follows:

{C1; . . . ; C2; . . . ;} details of which are described hereinafter.

The term "search query" refers to an information retrieval request to a search engine. A "search query" may be generated on one or more client devices, and transmitted to a group-based communication platform. For example, a search query associated with index documents may require retrieval of electronic message(s) based on the search criteria in the search query. The search criteria may include a group identifier criterion/criteria, which indicates one or more groups that a user has access privilege(s) to. The search criteria may include a channel identifier criterion/criteria, which indicates one or more channels that the user has access privilege(s) to.

Example System Architecture for Implementing Embodiments of the Present Invention Methods, apparatuses, and computer program products of the present invention may be embodied by any of a variety of devices. For example, the method, apparatus, and computer program product of an example embodiment may be embodied by a networked device (e.g., a group-based communication platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example system architecture 100 within which embodiments of the present invention may operate. Users may access a group-based communication platform 105 via a communication network 103 using client devices 101A-101N.

The client devices 101A-101N may be any computing device as defined above. Electronic data received by the group-based communication platform 105 from the client devices 101A-101N may be provided in various forms and via various methods. For example, the client devices 101A-101N may include desktop computers, laptop computers, smartphones, netbooks, tablet computers, wearables, and the like.

In embodiments where a client device of client devices 101A-101N is a mobile device, such as a smart phone or tablet, the client device may execute an "app" to interact with the group-based communication platform 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications.

Additionally or alternatively, the client devices 101A-101N may interact with the group-based communication platform 105 via a web browser. As yet another example, the client devices 101A-101N may include various hardware or firmware designed to interface with the group-based communication platform 105.

Communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 103 may include a cellular telephone, an 802.11, 802.16, 802.20, and/or WiMax network. Further, the communication network 103 may include a public network, such as the Internet, a private network, such as an intranet, or combinations thereof, and may utilize a variety of networking protocols including, but not limited to, TCP/IP based networking protocols. For instance, the networking protocol may be customized to suit the needs of the group-based communication platform 105. In some embodiments, the protocol is a custom protocol of JSON objects sent via a Websocket channel. In some embodiments, the protocol is JSON over RPC, JSON over REST/HTTP, and the like.

In various embodiments of the present invention, an electronic message or a search query may be sent to the group-based communication platform 105. In various implementations, the electronic message or the search query may be sent to the group-based communication platform 105 over communication network 103 directly by a client device of client devices 101A-101N. The electronic message or the search query may be also sent to the group-based communication platform 105 via an intermediary.

In some embodiments, the group-based communication platform 105 comprises a message server 107 and a search engine 111. The search engine 111 comprises an indexing server 109 and one or more storages 117A-117N.

The message server 107 may be embodied as a computer or computers. The message server 107 may provide for receiving electronic data from various sources including, but not limited to, the client devices 101A-101N. For example, the message server 107 may be operable to receive and post or transmit group-based electronic messages provided by the client devices 101A-101N via communication network 103.

The indexing server 109 generates indexes documents based on the electronic messages and handles search queries provided to the group-based communication platform 105. In some embodiments, the indexing server 109 generates filter cache via the cache complier component 113, and generates responses to search queries using the filter cache via the query analyzer component 115, details of which are described hereinafter.

The one or more storages 117A-117N may be embodied as a data storage device such as a Network Attached Storage (NAS) device or devices, or as a separate server or servers. The one or more storages 117A-117N include information accessible to the message server 107 and the indexing server 109.

It is noted that various components in the indexing server 109 may leverage the same computer or computing apparatus to perform the above-described operations. Similarly, various components of the message server 107 may leverage the same computer or computing apparatus to perform the above-described operations, and various components of the one or more storages 117A-117N may leverage the same computer or computing apparatus to perform the above-described operations.

Example Apparatus for Implementing Embodiments of the Present Invention

The indexing server 109 of FIG. 1 may be embodied by one or more computing systems, such as apparatus 200 shown in FIG. 2. The apparatus 200 may include processor 202, memory 204, input/output circuitry 206, communications circuitry 208, index circuitry 210, and search query circuitry 212. The apparatus 200 may be configured to execute the operations described above with respect to FIG. 1 and below with respect to FIGS. 3-12. Although these components 202-212 are described with respect to functional limitations, it should be understood that the particular implementations necessarily include the use of particular hardware. It should also be understood that certain of these components 202-212 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processor" or "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface circuitry and may include a display, which may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

The index circuitry 210 includes hardware configured to generate filter cache, details of which are described hereinafter. The index circuitry 210 may utilize processing circuitry, such as the processor 202, to perform these actions. The index circuitry 210 may store the filter cache in the memory 204. In some embodiments, the index circuitry 210 may include a separate processor, specially configured Field Programmable Gate Array (FPGA), or Application Specific Integrated Circuit (ASIC). The index circuitry 210 may be implemented using hardware components of the apparatus configured by either hardware or software for implementing the functions described herein.

The search query circuitry 212 includes hardware configured to analyze search queries and generate search results using the filter cache. The search query circuitry 212 may utilize processing circuitry, such as the processor 202, to perform these actions. The search query circuitry 212 may also retrieve the filter cache from the memory 204. However, it should also be appreciated that, in some embodiments, the search query circuitry 212 may include a separate processor, specially configured Field Programmable Gate Array (FPGA), or Application Specific Integrated Circuit (ASIC) for performing the functions described herein. The search query circuitry 212 may be implemented using hardware components of the apparatus configured by either hardware or software for implementing these planned functions.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Data Flows of Embodiments of the Present Invention

Various methods described hereinafter provide technical improvements over computer functionalities. For example, various processes described herein reduce latencies in handling search queries in a group-based communication platform by generating and utilizing a filter cache.

Generating Filter Cache

FIG. 3 illustrates an example flowchart of operations performed by a server circuitry (such as the index circuitry 210 of the indexing server 109 as shown in FIG. 2) in accordance with example embodiments of the present invention. Each block of the flowchart, and combinations of blocks in the flowchart, may be implemented by various means such as hardware, firmware, circuitry and/or other devices associated with execution of software including one or more computer program instructions. For example, one or more of the procedures described in FIG. 3 may be embodied by computer program instructions, which may be stored by a non-transitory memory of an apparatus employing an embodiment of the present invention and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

The process 300 starts at block 301. At block 303, a server circuitry (such as the index circuitry 210 of the indexing server 109 as shown in FIG. 2) may generate an index document array based on a plurality of index documents received from one or more client devices in a group-based communication platform, such as the client devices 101A-101N as shown in FIG. 1.

As described above, an index document may correspond to an electronic message received by the group-based communication platform. For example, a server circuitry (such as the index circuitry 210 of the indexing server 109 as shown in FIG. 2) may receive electronic messages from the client devices (such as client devices 101A-101N of FIG. 1). The client devices 101A-101N may provide the following code describing an electronic message, substantially in the form of a (Secure) Hypertext Transfer Protocol ("HTTP(S)") POST message including eXtensible Markup Language ("XML") formatted data:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL
        <digital_cert_link>www.mydigitalcertificate.com/
JohnDoeDaDoeDoe@gmail.com/mycertifcate.dc</digital_cert_link>
            //OPTIONAL
        <digital_certificate>_DATA_</digital_certificate>
        </user_account_credentials>
    </user_accounts_details>
    <client_details> //iOS Client with App and Webkit
        <client_IP>10.0.0.123</client_IP>
        <user_agent_string>Mozilla/5.0 (iPhone; CPU iPhone OS 7_1_1
like Mac OS X) AppleWebKit/537.51.2 (KHTML, like Gecko) Version/7.0
Mobile/11D201 Safari/9537.53</user_agent_string>
        <client_product_type>iPhone6,1</client_product_type>
        <client_serial_number>DNXXX1X1XXXX</client_serial_number
>
        <client_UDID>3XXXXXXXXXXXXXXXXXXXXXXXXD</client_U
DID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1
like Mac OS X) AppleWebKit/537.51.2 (KHTML, like Gecko) Version/7.0
Mobile/11D201 Safari/9537.53</user_agent_string>
```

```
    <client_product_type>iPhone6,1</client_product_type>
    <client_serial_number>DNXXX1X1XXXX</client_serial_number>
>
    <client_UDID>3XXXXXXXXXXXXXXXXXXXXXXXXD</client_U
DID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
</client_details>
<client_details> //Android Client with Webbrowser
    <client_IP>10.0.0.123</client_IP>
    <user_agent_string>Mozilla/5.0 (Linux; U; Android 4.0.4; en-us;
Nexus S Build/IMM76D) AppleWebKit/534.30 (KHTML, like Gecko)
Version/4.0 Mobile Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-
XXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
</client_details>
<client_details> //Mac Desktop with Webbrowser
    <client_IP>10.0.0.123</client_IP>
    <user_agent_string>Mozilla/5.0 (Macintosh; Intel Mac OS X
10_9_3) AppleWebKit/537.75.14 (KHTML, like Gecko) Version/7.0.3
Safari/537.75.14</user_agent_string>
    <client_product_type>MacPro5,1</client_product_type>
<client_serial_number>YXXXXXXXXZ</client_serial_number>
    <client_UDID>FXXXXXXXXX-XXXX-XXXX-XXXX-
XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
</client_details>
<message>
    <sender_identifier>5541263684</sender_identifier>
    <message_identifier>ID_message_10</message_identifier>
    <team_identifier>ID_team_1</team_identifier>
    <channel_identifier>ID_channel_1</channel_identifier>
    <contents>That is an interesting invention. </contents>
</message>
</auth_request>
```

In the above example, an electronic message is sent by a client device via a web browser to the group-based communication platform. The content of the electronic message is "That is an interesting invention." The group identifier associated with this electronic message is ID_team_1, and the channel identifier associated with this electronic message is ID_channel_1. Upon receiving this electronic message, an index document corresponding to this electronic message may be generated by an index circuitry (such as the index circuitry 210 of the indexing server 109). The index document may have a group identifier field with the value ID_team_1, and a channel identifier field with the value ID_channel_1.

In various embodiments of the present invention, a server circuitry (such as the index circuitry 210 of the indexing server 109 as shown in FIG. 2) generates an index document array for storing and managing a plurality of index documents. Each index document in the index document array is arranged based on an ordered sequence. For example, the server circuitry may first sort the plurality of index documents in an ascending or descending order according to group identifiers associated with the index documents. For index documents having the same group identifier, the server circuitry may then sort them in an ascending or descending order according to channel identifiers associated with these index documents.

Referring now to FIG. 4, an example index document array 402 is shown. The index document array comprises the following elements: index document 404, index document 406, index document 408, index document 410, index document 412, index document 414, index document 416, index document 418, and index document 420. Each index document has a group identifier (Group ID) field and a channel identifier (Channel ID) field. For example, the index document 404 has a group identifier field with a value of G200. In other words, the group identifier corresponding to index document 404 is G200. The index document 404 also has a channel identifier field with a value of C300. In other words, the channel identifier corresponding to index document 404 is C300.

In generating the index document array, a server circuitry (such as the index circuitry 210 of the indexing server 109 as shown in FIG. 2) may arrange each index document so that the index documents are in accordance with an ordered sequence. In some embodiments, the server circuitry first sorts the index documents based on the group identifier associated with each index document. As shown in FIG. 4, index documents having a group identifier G200 (such as index document 412) are arranged prior to the index document having a group identifier G201 (such as index document 414). In some embodiments, the server circuitry may sort the index documents in a descending order according to the group identifiers. In these embodiments, index document 412 would be arranged subsequent to index document 414 in the index document array.

Subsequent to sorting the index documents according to their group identifiers, the server circuitry may then sort index documents having the same group identifier based on their corresponding channel identifiers. Referring back to index document array 402 of FIG. 4, index document 408 and index document 410 have the same group identifier G200, but different channel identifiers. Index document 408 has a corresponding channel identifier C300, while index document 410 has a corresponding channel identifier C301. In some embodiments, the server circuitry may sort these index documents in an ascending order based on their channel identifiers, thus placing index document 408 prior to index document 410 in the index document array. In some embodiments, the server circuitry may sort these index documents in a descending order based on their channel identifiers, thus placing index document 408 subsequent to index document 410 in the index document array.

In various embodiments, each index document is associated with a time stamp, which indicates the system time at which the index document (e.g. an electronic message) is generated in the group-based communication platform. For index documents having the same group identifier and the same channel identifier, the server circuitry may further sort these index documents in an ascending or descending order based on the time stamps.

In some embodiments, the time stamp is a Unix timestamp in seconds multiplied by one million and incremented by a counter. If two electronic messages are transmitted to the group-based communication platform at the same time (i.e. at the same second), one of the electronic message will have a counter value of zero (0) and the other electronic message will have a counter value of one (1). As a result, no two electronic messages may have the same time stamp, and accordingly, no two index documents have the same time stamp.

In some embodiments, a document identifier is assigned to each index document after the sorting in the index document array is completed. In other words, the document identifier indicates the place of the corresponding index document in the index document array. For example, referring back to FIG. 4, index document 404 has a document identifier field with a value of D100 (i.e. the corresponding document identifier for index document 404 is D100). Index document 416 has a document identifier field with a value of D106 (i.e. the corresponding document identifier for index document 516 is D106).

Further, the difference of document identifiers between two index documents indicates the offset between these two index documents. Continuing from the example above, the difference between index document 416 and index document 404 is five:

$$D106-D100=5$$

which indicates that there are five index documents between index document 404 and index document 416 in the index document array 402.

Referring to FIG. 3, at block 305, a server circuitry (such as the index circuitry 210 of the indexing server 109 as shown in FIG. 2) may generate a group identifier array comprising a plurality of group identifiers. Each group identifier in the group identifier array indicates a group identifier associated with an index document in the index document array.

In some embodiments, there is a one-to-one relationship between index documents in the index document array and group identifiers in the group identifier array—one index document in the index document array corresponds to one group identifier in the group identifier array, and one group identifier in the group identifier array corresponds to one index document in the index document array. Further, the group identifiers in the group identifier array are arranged based on their corresponding index documents in the index document array.

Referring to FIG. 5, an example group identifier array 501 corresponding to the index document array 402 is shown. The group identifier array 501 comprises: group identifier 503, group identifier 505, group identifier 507, group identifier 509, group identifier 511, group identifier 513, group identifier 515, group identifier 517, and group identifier 519. Each of the group identifiers in the group identifier array 501 has a corresponding index document in the index document array 402. For example, group identifier 503 corresponds to and indicates the group identifier of index document 404. Group identifier 505 corresponds to and indicates the group identifier of index document 406.

As shown in FIG. 5, each group identifier in the group identifier array 501 is arranged based on its corresponding index document in the index document array 402. For example, index document 410 is the fourth index document in the index document array 402. Accordingly, group identifier 509, which corresponds to index document 410, is the fourth in the group identifier array 501.

Referring to FIG. 3, at block 307, a server circuitry (such as the index circuitry 210 of the indexing server 109 as shown in FIG. 2) may generate a group identifier lookup array based on the group identifier array. The group identifier lookup array comprises a plurality of group identifier nodes, and each group identifier node corresponds to a unique group identifier associated with the plurality of index documents.

In some embodiments, the server circuitry may identify the unique group identifiers in the group identifier array by performing read operations on each group identifier in the group identifier array. When the server circuitry determines that a group identifier is unique (i.e. the group identifier has not previously appeared in the group identifier array), the server circuitry keeps the group identifier in the group identifier array. When the server circuitry determines that a group identifier is not unique (i.e. the group identifier has previously appeared in the group identifier array), the server circuitry removes the group identifier from the group identifier array. After the above-referenced operations have been performed on each group identifier in the group identifier array, a group identifier lookup array is generated.

Referring to FIG. 5, an example group identifier lookup array 521 corresponding to the index document array 402 is shown. The group identifier lookup array 521 comprises group identifier node 523, group identifier node 525, and group identifier node 527. Each of these group identifier nodes indicates a unique group identifier associated with the index documents in the index document array 402.

To generate the group identifier lookup array 521, the server circuitry reads each group identifier in the group identifier array 501 and removes duplicate group identifiers from the group identifier array 501. For example, when the server circuitry performs read operation on group identifier 503, it determines that group identifier 503 is unique because its corresponding value G200 has not appeared in the group identifier array 501. Therefore, the server circuitry generates a group identifier node 523 corresponding to the group identifier 503 in the group identifier lookup array 521. The server circuitry then performs read operation on group identifier 505, and determines that group identifier 505 is not unique because its corresponding value G200 has appeared in the group identifier array 501 (i.e. in group identifier 503). Because the value of group identifier 505 is a duplicate of group identifier 503, the server circuitry removes group identifier 505. The server circuitry performs above-referenced operations on each group identifier in the group identifier array 501.

In some embodiments, the server circuitry may iterate through the document array to identify changes in the values of group identifier nodes. For example, the server circuitry may execute the following algorithm written in JAVA code:

```
long[ ] ids = new long[uniqueValues + 1];
   int[ ] docOffsets = new int[uniqueValues + 1];
   docOffsets[0] = ndv.nextDoc( );
   long current = ids[0] = ndv.longValue( );
   int offset = 1;
   while (ndv.nextDoc( ) != DocIdSetIterator.NO_MORE_DOCS) {
      if (ndv.longValue( ) != current) {
         docOffsets[offset] = ndv.docID( );
         current = ids[offset] = ndv.longValue( );
         offset++;
      }
   }
   ids[offset] = Long.MAX_VALUE;
   docOffsets[offset] = maxDocs;
```

In the above code, unique Values is a constant associated with the array (distinct from the array length) that indicates how many unique values the array contains. By doing so, the server circuitry can identify unique group identifiers associated with the index documents in the index document array 402.

Referring to FIG. 3, at block 309, a server circuitry (such as the index circuitry 210 of the indexing server 109 as shown in FIG. 2) may generate a channel identifier array comprising a plurality of channel identifiers. Each channel identifier in the channel identifier array indicates a channel identifier associated with an index document in the index document array.

In some embodiments, there is a one-to-one relationship between index documents in the index document array and channel identifiers in the channel identifier array—one index document in the index document array corresponds to one channel identifier in the channel identifier array, and one channel identifier in the channel identifier array corresponds to one index document in the index document array. Further, the channel identifiers in the channel identifier array are arranged based on their corresponding index documents in the index document array.

Referring to FIG. 6, an example channel identifier array 602 corresponding to the index document array 402 is shown. The channel identifier array 602 comprises: channel identifier 604, channel identifier 606, channel identifier 608, channel identifier 610, channel identifier 612, channel identifier 614, channel identifier 616, channel identifier 618, and channel identifier 620. Each of the channel identifiers in the channel identifier array 602 has a corresponding index document in the index document array 402. For example, channel identifier 604 corresponds to and indicates the channel identifier of index document 404. Channel identifier 606 corresponds to and indicates the channel identifier of index document 406.

As shown in FIG. 6, each channel identifier in the channel identifier array 602 is arranged based on its corresponding index document in the index document array 402. For example, index document 410 is the fourth index document in the index document array 402. Accordingly, channel identifier 610, which corresponds to index document 410, is the fourth in the channel identifier array 602.

Referring to FIG. 3, at block 311, a server circuitry (such as the index circuitry 210 of the indexing server 109 as shown in FIG. 2) may generate a channel identifier lookup array based on the channel identifier array. The channel identifier lookup array comprises a plurality of channel identifier nodes, and each channel identifier node corresponds to a unique channel identifier associated with the plurality of index documents.

In some embodiments, the server circuitry may identify the unique channel identifiers in the channel identifier array by performing read operations on each channel identifier in the channel identifier array. When the server circuitry determines that a channel identifier is unique (i.e. the channel identifier has not previously appeared in the channel identifier array), the server circuitry keeps the channel identifier in the channel identifier array. When the server circuitry determines that a channel identifier is not unique (i.e. the channel identifier has previously appeared in the channel identifier array), the server circuitry removes the channel identifier from the channel identifier array. After the above-referenced operations are performed on each channel identifier in the channel identifier array, a channel identifier lookup array is generated.

Referring to FIG. 6, an example channel identifier lookup array 622 corresponding to the index document array 402 is shown. The channel identifier lookup array 622 comprises channel identifier node 624, channel identifier node 626, channel identifier node 628, channel identifier node 630, and channel identifier node 632. Each of these channel identifier nodes indicates a unique channel identifier associated with the index documents in the index document array 402.

To generate the channel identifier lookup array 622, the server circuitry reads each channel identifier in the channel identifier array 602 and removes duplicate channel identifiers from the channel identifier array 602. For example, when the server circuitry performs read operation on channel identifier 604, it determines that channel identifier 604 is unique because its corresponding value C300 has not appeared in the channel identifier array 602. Therefore, the server circuitry generates a channel identifier node 624 corresponding to the channel identifier 604 in the channel identifier lookup array 622. The server circuitry then performs read operation on channel identifier 606, and determines that channel identifier 606 is not unique because its corresponding value C300 has appeared in the channel identifier array 602 (i.e. in channel identifier 604). Because the value of channel identifier 606 is a duplicate of channel identifier 604, the serve circuitry removes the channel identifier 606. The server circuitry performs the above-referenced operations on each channel identifier in the channel identifier array 602.

In some embodiments, the server circuitry may generate the channel identifier lookup array 622 by iterating through the document array to identify changes in the values of channel identifier nodes, in a way similar to generating the group identifier lookup array.

Referring back to FIG. 3, at block 313, a server circuitry (such as the index circuitry 210 of the indexing server 109 as shown in FIG. 2) may generate a filter cache for the index document array. The server circuitry may generate the filter cache based at least on the group identifier lookup array and the channel identifier lookup array.

In some embodiments, the filter cache comprises a group identifier offset array. The group identifier offset array further comprises a plurality of group identifier pointer. Each group identifier node in the group identifier lookup array has a corresponding group identifier pointer in the group identifier offset array, and the corresponding group identifier pointer maps the group identifier node to a first corresponding channel identifier node in the channel identifier lookup array.

Referring now to FIG. 7, an example group identifier offset array 701 corresponding to group identifier lookup array 521 is shown. The group identifier offset array 701 comprises group identifier pointers 703, 705, and 707. Each group identifier node in the group identifier lookup array 521 has a corresponding group identifier pointer. For example, group identifier pointer 703 corresponds to group identifier node 523, group identifier pointer 705 corresponds to group identifier node 525, and group identifier pointer 707 corresponds to group identifier node 527.

Further, each group identifier pointer indicates the starting position of a first channel identifier node in the channel identifier lookup array 622 that corresponds to the group identifier node. For example, the group identifier pointer 703 indicates the starting position of channel identifier node 624. In other words, group identifier pointer 703 indicates that the first channel corresponds to the group with the group identifier G200 is the channel with the channel identifier C300. As shown in FIG. 7, the group may have other corresponding channels (such as channel with the channel identifier C301), but these other channels are not the first channel corresponding to the group (as shown in the channel identifier lookup array 622). Similarly, group identifier pointer 705 indicates that the first channel corresponds to the group with the group identifier G201 is the channel with the channel identifier C302, and group identifier pointer 707 indicates that the first channel corresponds to the group with the group identifier G202 is the channel with the channel identifier C303 (not the channel with channel identifier 304).

In some embodiments, each group identifier pointer is associated with an offset value that indicates the corresponding starting position of the channel identifier node. For example, as shown in FIG. 7, the group identifier pointer 703 is associated with an offset value TO1, which indicates the starting position of channel identifier node 624. The group identifier pointer 705 is associated with an offset value TO2, which indicates the starting position of channel identifier node 628. A server circuitry (such as the index circuitry 210 of the indexing server 109 as shown in FIG. 2) may calculate the offset value of each unique group identifier in the group identifier array when generating the group identifier lookup array, as shown above in the example JAVA code.

In some embodiments, the filter cache also comprises a channel identifier offset array. The channel identifier offset array further comprises a plurality of channel identifier pointers. Each channel identifier node in the channel identifier lookup array has a corresponding channel identifier pointer in the channel identifier offset array, and the corresponding channel identifier pointer maps the channel identifier node to a first corresponding index document in the index document array.

Referring now to FIG. 8, an example channel identifier offset array 802 corresponding to channel identifier lookup array 622 is shown. The channel identifier offset array 802 comprises channel identifier pointers 804, 806, 808, 812, and 812. Each channel identifier node in the channel identifier lookup array 622 has a corresponding channel identifier pointer. For example, channel identifier pointer 804 corresponds to channel identifier node 624, channel identifier pointer 806 corresponds to channel identifier node 626, and channel identifier pointer 808 corresponds to channel identifier node 628.

Further, each channel identifier pointer indicates the starting position of a first index document in the index document array 402 that corresponds to the channel identifier node. For example, the channel identifier pointer 804 indicates the starting position of index document 404. In other words, channel identifier pointer 804 indicates that the first index document corresponds to the channel with the channel identifier C300 is the index document with the document identifier D100. As shown in FIG. 8, the channel with the channel identifier C300 may have other corresponding index documents (such as index document with the document identifier D101), but these other index documents are not the first index document corresponding to the channel (as shown in the index document array 402).

In some embodiments, each channel identifier pointer is associated with an offset value that indicates the corresponding starting position of the index document. For example, as shown in FIG. 8, the channel identifier pointer 804 is associated with an offset value CO1, which indicates the starting position of index document with the document identifier D100. The channel identifier pointer 806 is associated with an offset value CO2, which indicates the starting position of index document with the document identifier D103. The server circuitry (such as the index circuitry 210 of the indexing server 109 as shown in FIG. 2) may use similar techniques described above to calculate the offset values.

In some embodiments, the filter cache further comprises the group identifier lookup array and the channel identifier lookup array, in addition to the group identifier offset array and the channel identifier offset array, as shown in the filter cache 800 in FIG. 8.

In some embodiments, the filter cache is stored in the at least one non-transitory memory (for example, the memory 204 of the indexing server 109 as shown in FIG. 2).

The process 300 ends at block 315.

Applying Filter Query Using Filter Cache

FIGS. 9A-9B illustrate example flowcharts of operations performed by a server circuitry (such as the search query circuitry 212 of the indexing server 109 as shown in FIG. 2) in accordance with example embodiments of the present invention. Each block of the flowchart, and combinations of blocks in the flowchart, may be implemented by various means such as hardware, firmware, circuitry and/or other devices associated with execution of software including one or more computer program instructions. For example, one or more of the procedures described in FIGS. 9A-9B may be embodied by computer program instructions, which may be stored by a non-transitory memory of an apparatus employing an embodiment of the present invention and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

The process 900 illustrates an example process of applying filter query operation using the filter cache. The filter query operation determines index documents that the search query submitter has the privilege to access. In some embodiments, a server circuitry (such as the search query circuitry 212 of the indexing server 109 as shown in FIG. 2) may carry out the filter query operation prior to analyzing the content of the search query.

The process 900 starts at block 901 in FIG. 9A. At block 903, a server circuitry (such as the search query circuitry 212 of the indexing server 109 as shown in FIG. 2) may receive a search query associated with the plurality of index documents from one or more client devices in a group-based communication platform, such as the client devices 101A-101N as shown in FIG. 1.

In some embodiments, a server circuitry (such as the search query circuitry 212 of the indexing server 109 as shown in FIG. 2) may determine a group identifier criterion from the search query at block 905. For example, as shown in FIG. 10, the server circuitry may determine a group identifier criterion 1002 from the search query. The group identifier criterion 1002 requests retrieval of electronic messages associated with a group having a group identifier G200.

In some embodiments, to determine the group identifier criterion 1002 associated with the search query, the server circuitry may identify a list of group identifies and channel identifiers based on the search query. For example, when a user submits a search query, the server circuitry may retrieve a user identifier associated with the user, and look up groups and channels that the user identifier has access privilege to. The server circuitry then generates a list of group identifiers and channel identifiers accordingly as part of the filter query argument. For example, a filter query "fq" may contain a list of groups/channels that the user has access to ("f"), and the query argument itself ("q") is the text that the user typed in (e.g. the logistic regression). The filter query "fq" is passed onto the group-based communication platform as part of the request.

Referring back to FIG. 9A, at block 907, a server circuitry (such as the search query circuitry 212 of the indexing server 109 as shown in FIG. 2) may identify a first group identifier node corresponding to the group identifier criterion in the group identifier lookup array. For example, the server circuitry may perform a binary search in the group identifier lookup array to identify a matching group identifier node (i.e. the first group identifier node) based on the group identifier criterion. Once the first group identifier node is determined, the server circuitry may determine the first channel identifier node in the channel identifier lookup array (corresponding to the first group identifier node) based on the group identifier offset array at block 909.

For example, as shown in FIG. 10, the server circuitry may conduct a binary search in the group identifier lookup array 521, and identify group identifier node 523 as being corresponding to the group identifier criterion 1002 (both are associated with the group identifier G200). Upon determining the first group identifier node 523, the server circuitry then determines the first corresponding channel identifier node 624 based on the group identifier pointer 703.

Referring back to FIG. 9A, at block 913, a server circuitry (such as the search query circuitry 212 of the indexing server 109 as shown in FIG. 2) may also identify a second group identifier node in the group identifier lookup array. The second group identifier node is subsequent to (i.e. next to) the first group identifier node in the group identifier lookup array. Once the second group identifier node is determined, the server circuitry may determine the second channel identifier node in the channel identifier lookup array (corresponding to the second group identifier node) based on the group identifier offset array at block 915.

For example, as shown in FIG. 10, after determining the group identifier node 523 as the first group identifier node, the server circuitry may identify the next group identifier node in the group identifier lookup array 521 (i.e. group identifier node 525) as the second group identifier node. Upon determining the second group identifier node 525, the server circuitry then determines the second corresponding channel identifier node 628 based on the corresponding group identifier pointer 705.

Referring back to FIG. 9A, at block 917, a server circuitry (such as the search query circuitry 212 of the indexing server 109 as shown in FIG. 2) may determine one or more channel identifier nodes based on the first channel identifier node and the second channel identifier node in the channel identifier lookup array.

For example, as shown in FIG. 10, the server circuitry determines channel identifier node 624 as the first channel identifier node, and channel identifier node 628 as the second channel identifier node. The server circuitry then determines one or more channel identifier nodes(s) between the first channel identifier node (inclusive) and the second channel identifier node (exclusive) in the channel identifier lookup array. In FIG. 10, the one or more channel identifier nodes include the first channel identifier node 624 and the channel identifier node 624 (which is between the first channel identifier node and the second channel identifier node).

Continuing to FIG. 9B, at block 919, a server circuitry (such as the search query circuitry 212 of the indexing server 109 as shown in FIG. 2) may further determine a channel identifier criterion from the search query. For example, as shown in FIG. 11, the server circuitry may determine a channel identifier criterion 1101 from the search query. The channel identifier criterion 1101 requests retrieval of electronic messages associated with a channel having a channel identifier C300.

Referring back to FIG. 9B, at block 921, a server circuitry (such as the search query circuitry 212 of the indexing server 109 as shown in FIG. 2) may identify a first channel identifier node corresponding to the channel identifier criterion among the one or more channel identifier node(s) determined at block 917. For example, the server circuitry may perform a binary search among the determined channel identifier node(s) to identify a matching channel identifier node (i.e. the first channel identifier node) based on the channel identifier criterion. Once the first channel identifier node is determined, the server circuitry may determine the first index document in the index document array corresponding to the channel identifier node based on the channel identifier offset array at block 909.

For example, as shown in FIG. 11, the server circuitry may conduct a binary search and identify channel identifier node 624 as being corresponding to the channel identifier criterion 1101 (both are associated with the channel identifier C300). Upon determining the first channel identifier node 624, the server circuitry then determines the first corresponding index document 404 based on the channel identifier pointer 804.

Referring back to FIG. 9B, at block 925, a server circuitry (such as the search query circuitry 212 of the indexing server 109 as shown in FIG. 2) may also identify a second channel identifier node in the channel identifier lookup array. The second channel identifier node is subsequent to (i.e. next to)

the first channel identifier node in the channel identifier lookup array. Once the second channel identifier node is determined, the server circuitry may determine the second index document in the index document array that is associated with the second channel identifier node based on the channel identifier offset array at block 927.

For example, as shown in FIG. 11, after determining the channel identifier node 624 as the first channel identifier node, the server circuitry may identify the next channel identifier node in the channel identifier lookup array 622 (i.e. channel identifier node 626) as the second channel identifier node. Upon determining the second channel identifier node 626, the server circuitry then determines the second corresponding index document 410 based on the corresponding channel identifier pointer 806.

Referring back to FIG. 9B, at block 929, a server circuitry (such as the search query circuitry 212 of the indexing server 109 as shown in FIG. 2) may determine one or more index documents based on the first index document and the second index document in the index document array.

For example, as shown in FIG. 11, the server circuitry determines index document 404 as the first index document, and index document 410 as the second index document. The server circuitry then determines one or more index document(s) between the first index document (inclusive) and the second index document (exclusive). In FIG. 10, the one or more index documents include index document 404, index document 406, index document 408, and index document 410.

The process 900 ends at block 931, as shown in FIG. 9B.

FIG. 12 illustrates an example index document group 1200 generated based on an example filter query in accordance with various embodiments of the invention. A server circuitry (such as the search query circuitry 212 of the indexing server 109 as shown in FIG. 2) may determine that a search query is submitted by a user X. The server circuitry further determines that the user X has the access privilege to Channel C300 of Group G200 and Channel C303 of Group G202. The server circuitry then proceeds to determine index documents associated with each group/channel combination. For example, to determine index documents in Channel C300 of Group G200, the server circuitry may carry out operations as illustrated in FIGS. 10-11, and identify index documents 404-408. Similarly, the server circuitry may determine index documents 416-420 for Channel C303 of Group G202.

After determining index documents that the user X has access privilege to, the server circuitry may then perform the search query on these index documents. By applying the filter query based on the filter cache, the server circuitry only searches index documents that the search query submitter has access privilege to. Because the filter cache is stored in the memory and easily accessible by the server circuitry, latency in generating search results is reduced.

Additional Implementation Details

Although example processing systems have been described in FIGS. 1-2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed:

1. One or more non-transitory computer-readable media storing computer-executable instructions that, when executed by at least one processor, perform a method for providing permission-based document access, comprising:
    identifying a set of groups to which a user has group access permissions;
    identifying a set of channels within each group of the set of groups to which the user has channel access permissions;

identifying a plurality of document identifiers associated with each group of the set of groups;

identifying, based on the set of channels and the set of groups, a set of accessible document identifiers from the plurality of document identifiers to which the user has document access permissions;

generating a user-specific filter cache comprising the set of accessible document identifiers from the plurality of document identifiers;

storing the user-specific filter cache comprising the set of accessible document identifiers in a data store;

applying a filter query to the set of accessible document identifiers based at least in part on the user-specific filter cache;

after applying the filter query, analyzing the set of accessible document identifiers based on a search query; and providing, to the user, access to a document associated with a respective accessible document identifier of the set of accessible document identifiers.

2. The computer-readable media of claim 1, the method further comprising:

identifying a subsequent set of groups to which a subsequent user has subsequent group access permissions;

identifying a subsequent set of channels within each group of the subsequent set of groups to which the subsequent user has subsequent channel access permissions; and identifying, based on the subsequent set of channels and the subsequent set of groups, a subsequent set of accessible document identifiers from the plurality of document identifiers to which the subsequent user has subsequent document access permissions.

3. The computer-readable media of claim 2, the method further comprising:

generating a subsequent user-specific filter cache comprising the subsequent set of accessible document identifiers from the plurality of document identifiers; and storing the subsequent user-specific filter cache comprising the subsequent set of accessible document identifiers in the data store, wherein the subsequent set of accessible document identifiers is distinct from the set of accessible document identifiers.

4. The computer-readable media of claim 3, the method further comprising:

applying a subsequent filter query to the subsequent set of accessible document identifiers based at least in part on the subsequent user-specific filter cache;

after applying the subsequent filter query, analyzing the subsequent set of accessible document identifiers based on a subsequent search query; and providing, to the subsequent user, access to a subsequent document associated with a subsequent respective accessible document identifier of the subsequent set of accessible document identifiers.

5. The computer-readable media of claim 1, wherein the set of accessible document identifiers of the user-specific filter cache is updated based on a change in a channel membership of the user.

6. The computer-readable media of claim 1, the method further comprising:

identifying a plurality of group identifiers for the set of groups to which the user has the group access permissions; and adding the plurality of group identifiers to a group identifier array associated with the set of groups to which the user has the group access permissions.

7. The computer-readable media of claim 6, the method further comprising:

responsive to determining that a group identifier of the group identifier array is not unique, removing the group identifier from the group identifier array.

8. A method for providing permission-based document access comprising:

identifying a set of groups to which a user has group access permissions;

identifying a set of channels within each group of the set of groups to which the user has channel access permissions;

identifying a plurality of document identifiers associated with each group of the set of groups;

identifying, based on the set of channels and the set of groups, a set of accessible document identifiers from the plurality of document identifiers to which the user has document access permissions;

generating a user-specific filter cache comprising the set of accessible document identifiers from the plurality of document identifiers;

storing the user-specific filter cache comprising the set of accessible document identifiers in a data store;

applying a filter query to the set of accessible document identifiers based at least in part on the user-specific filter cache;

after applying the filter query, analyzing the set of accessible document identifiers based on a search query; and providing, to the user, access to a document associated with a respective accessible document identifier of the set of accessible document identifiers.

9. The method of claim 8, further comprising:

identifying a subsequent set of groups to which a subsequent user has subsequent group access permissions;

identifying a subsequent set of channels within each group of the subsequent set of groups to which the subsequent user has subsequent channel access permissions; and identifying, based on the subsequent set of channels and the subsequent set of groups, a subsequent set of accessible document identifiers from the plurality of document identifiers to which the subsequent user has subsequent document access permissions.

10. The method of claim 9, further comprising:

generating a subsequent user-specific filter cache comprising the subsequent set of accessible document identifiers from the plurality of document identifiers; and storing the subsequent user-specific filter cache comprising the subsequent set of accessible document identifiers in the data store, wherein the subsequent set of accessible document identifiers is distinct from the set of accessible document identifiers.

11. The method of claim 10, further comprising:

applying a subsequent filter query to the subsequent set of accessible document identifiers based at least in part on the subsequent user-specific filter cache;

after applying the subsequent filter query, analyzing the subsequent set of accessible document identifiers based on a subsequent search query; and providing, to the subsequent user, access to a subsequent document associated with a subsequent respective accessible document identifier of the subsequent set of accessible document identifiers.

12. The method of claim 8, wherein the set of accessible document identifiers of the user-specific filter cache is updated based on a change in a channel membership of the user.

13. The method of claim 8, further comprising:
identifying a plurality of group identifiers for the set of groups to which the user has the group access permissions; and
adding the plurality of group identifiers to a group identifier array associated with the set of groups to which the user has the group access permissions.

14. The method of claim 13, further comprising:
responsive to determining that a group identifier of the group identifier array is not unique, removing the group identifier from the group identifier array.

15. A system comprising at least one processor and at least one non-transitory computer-readable media storing computer-executable instructions that, when executed by the at least one processor, perform a method for providing permission-based document access, comprising:
identifying a set of groups to which a user has group access permissions;
identifying a set of channels within each group of the set of groups to which the user has channel access permissions;
identifying a plurality of document identifiers associated with each group of the set of groups;
identifying, based on the set of channels and the set of groups, a set of accessible document identifiers from the plurality of document identifiers to which the user has document access permissions;
generating a user-specific filter cache comprising the set of accessible document identifiers from the plurality of document identifiers;
storing the user-specific filter cache comprising the set of accessible document identifiers in a data store;
applying a filter query to the set of accessible document identifiers based at least in part on the user-specific filter cache;
after applying the filter query, analyzing the set of accessible document identifiers based on a search query; and
providing, to the user, access to a document associated with a respective accessible document identifier of the set of accessible document identifiers.

16. The system of claim 15, the method further comprising:
identifying a subsequent set of groups to which a subsequent user has subsequent group access permissions;
identifying a subsequent set of channels within each group of the subsequent set of groups to which the subsequent user has subsequent channel access permissions; and
identifying, based on the subsequent set of channels and the subsequent set of groups, a subsequent set of accessible document identifiers from the plurality of document identifiers to which the subsequent user has subsequent document access permissions.

17. The system of claim 16, the method further comprising:
generating a subsequent user-specific filter cache comprising the subsequent set of accessible document identifiers from the plurality of document identifiers; and
storing the subsequent user-specific filter cache comprising the subsequent set of accessible document identifiers in the data store,
wherein the subsequent set of accessible document identifiers is distinct from the set of accessible document identifiers.

18. The system of claim 17, the method further comprising:
applying a subsequent filter query to the subsequent set of accessible document identifiers based at least in part on the subsequent user-specific filter cache;
after applying the subsequent filter query, analyzing the subsequent set of accessible document identifiers based on a subsequent search query; and
providing, to the subsequent user, access to a subsequent document associated with a subsequent respective accessible document identifier of the subsequent set of accessible document identifiers.

19. The system of claim 15, wherein the set of accessible document identifiers of the user-specific filter cache is updated based on a change in a channel membership of the user.

20. The system of claim 15, the method further comprising:
identifying a plurality of group identifiers for the set of groups to which the user has the group access permissions; and
adding the plurality of group identifiers to a group identifier array associated with the set of groups to which the user has the group access permissions.

* * * * *